(12) United States Patent
Nakanishi et al.

(10) Patent No.: US 11,460,978 B2
(45) Date of Patent: Oct. 4, 2022

(54) DISPLAY APPARATUS AND NON-TRANSITORY COMPUTER-READABLE STORAGE MEDIUM STORING DISPLAY CONTROL PROGRAM

(71) Applicant: SEIKO EPSON CORPORATION, Tokyo (JP)

(72) Inventors: Hiroaki Nakanishi, Nagano (JP); Toshifumi Sakai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/912,821

(22) Filed: Jun. 26, 2020

(65) Prior Publication Data
US 2020/0409517 A1    Dec. 31, 2020

(30) Foreign Application Priority Data
Jun. 28, 2019   (JP) .............................. JP2019-121695

(51) Int. Cl.
*G06F 3/0483*    (2013.01)
*G06T 3/60*    (2006.01)
*G06F 3/04845*    (2022.01)

(52) U.S. Cl.
CPC ........ *G06F 3/0483* (2013.01); *G06F 3/04845* (2013.01); *G06T 3/60* (2013.01); *G06T 2200/24* (2013.01)

(58) Field of Classification Search
CPC .. G06F 3/0483; G06F 3/04845; G06F 3/0488; G06F 3/0485; G06F 1/1643; G06F 1/1681; G06T 3/60; G06T 2200/24; H04M 1/0268; H04M 1/0214; H04M 1/0241; H04M 2250/12; H04M 2250/22
See application file for complete search history.

(56) References Cited

U.S. PATENT DOCUMENTS

| | | | | |
|---|---|---|---|---|
| 8,847,991 | B1* | 9/2014 | Upson ................... | G06F 1/1652 345/656 |
| 9,785,232 | B2* | 10/2017 | Cha ........................ | G06F 3/0481 |
| 2010/0026719 | A1* | 2/2010 | Ozawa ................... | G06F 3/0487 345/650 |
| 2010/0066763 | A1* | 3/2010 | MacDougall ......... | G06F 1/1626 345/656 |
| 2012/0214552 | A1* | 8/2012 | Sirpal ................... | G06F 3/0481 455/566 |
| 2013/0219270 | A1* | 8/2013 | Cranfill ................. | G06F 3/0488 715/269 |
| 2013/0329249 | A1* | 12/2013 | Naya ................... | H04N 1/00411 358/1.15 |
| 2017/0053195 | A1* | 2/2017 | Sasajima ............... | G06F 3/1258 |

FOREIGN PATENT DOCUMENTS

| | | |
|---|---|---|
| CN | 102566886 A | 7/2012 |
| JP | 2014-145972 A | 8/2014 |
| WO | 2013/175751 A1 | 1/2016 |

* cited by examiner

*Primary Examiner* — William A Beutel
(74) *Attorney, Agent, or Firm* — Global IP Counselors, LLP

(57) ABSTRACT

When a page image is to be displayed, a display apparatus changes a display mode in which the page image is displayed on a display section according to both the orientation of the page image and the orientation of the display section.

12 Claims, 14 Drawing Sheets

DISPLAY APPARATUS AND NON-TRANSITORY COMPUTER-READABLE STORAGE MEDIUM STORING DISPLAY CONTROL PROGRAM

The present application is based on, and claims priority from JP Application Serial Number 2019-121695, filed Jun. 28, 2019, the disclosure of which is hereby incorporated by reference herein in its entirety.

BACKGROUND

1. Technical Field

The present disclosure relates to a display apparatus and a non-transitory computer-readable storage medium storing a display control program.

2. Related Art

A terminal with two touch panels is known as one type of smartphone or tablet terminal (see International Publication No. WO2013/175751). With this type of terminal, two cases, each of which has a touch panel, are coupled with a hinge. According to International Publication No. WO2013/175751, while in a two-screen state in which the two touch panels are open, the terminal can execute a full-screen mode in which one application is executed and displayed on the whole of the two screens and a two-application mode in which two different applications are executed and displayed on the two screens, one on each screen.

In International Publication No. WO2013/175751, there remain matters to be improved so that the user can more easily view images.

SUMMARY

A display apparatus includes a display section on which an image is displayed, a deciding section that makes a decision about the orientation of the display section, and a display control section that controls displaying on the display section. In displaying a first page image representing a first page, a second page image representing a second page, or both on the display section, in a first case in which images to be displayed are in portrait orientation and the display section is in horizontal orientation, the display control section displays the first page image and the second page image on the display section so that the page images are arranged horizontally; in a second case in which an image to be displayed is in portrait orientation and the display section is in vertical orientation, the display control section displays the first page image or the second page image on the display section so that the first page image or the second page image has a larger size than in the first case; in a third case in which images to be displayed are in landscape orientation and the display section is in vertical orientation, the display control section displays the first page image and the second page image on the display section so that the page images are arranged vertically; and in a fourth case in which an image to be displayed is in landscape orientation and the display section is in horizontal orientation, the display control section displays the first page image or the second page image on the display section so that the first page image or the second page image has a larger size than in the third case.

DESCRIPTION OF EXEMPLARY EMBODIMENTS

An embodiment of the present disclosure will be described below with reference to the drawings. Since these drawings just exemplify this embodiment, each drawing may have an inaccurate ratio or may be inconsistent with other drawings or part of each drawing may be eliminated.

1. Structure of a Terminal Apparatus

Figure 1:
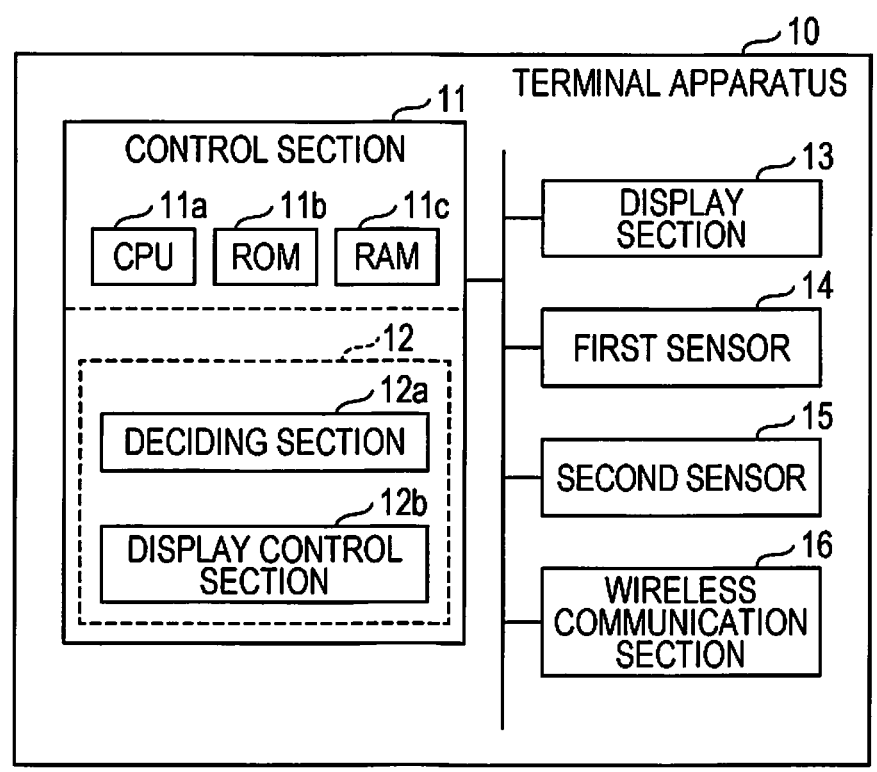
FIG. 1 is a block diagram schematically illustrating the structure of a terminal apparatus.

FIG. 1 schematically illustrates the structure of a terminal apparatus 10 in this embodiment. The terminal apparatus 10 is a smartphone or tablet terminal. The terminal apparatus 10 includes a control section 11, a display section 13, a first sensor 14, a second sensor 15, and a wireless communication section 16. The control section 11 includes one or a plurality of integrated circuit (IC) chips, each of which has a central processing unit (CPU) 11a used as a processor, a read-only memory (ROM) 11b, a random-access memory (RAM) 11c, and the like.

In the control section 11, the processor, that is, the CPU 11a, controls the terminal apparatus 10 by using the RAM 11c as a work area to execute computation processing according to various programs stored in the ROM 11b and other memories. The control section 11 functions as a deciding section 12a and a display control section 12b according to a display control program 12, which is one type of program.

Figure 2:
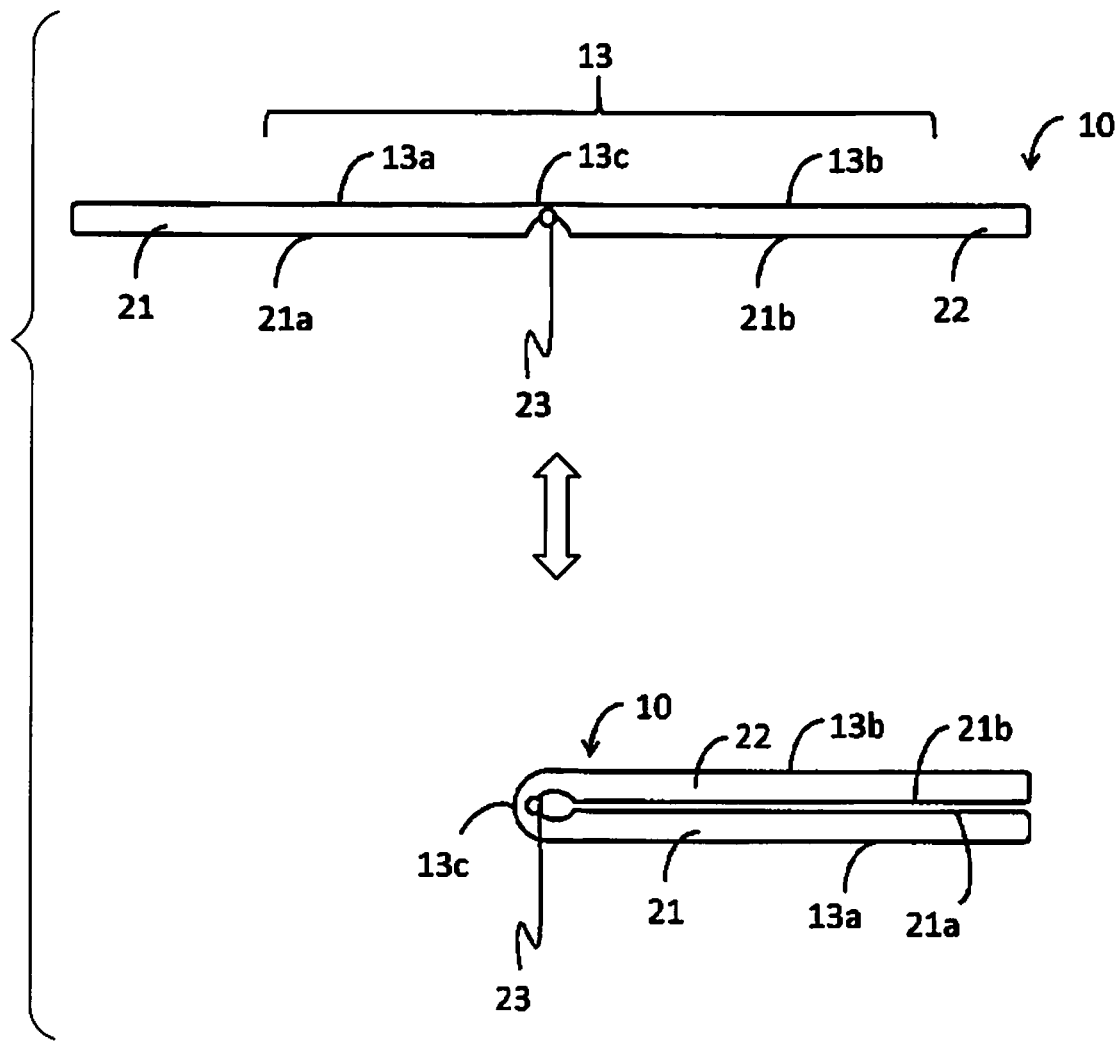
FIG. 2 illustrates how the state of the terminal apparatus changes.
Figure 3:
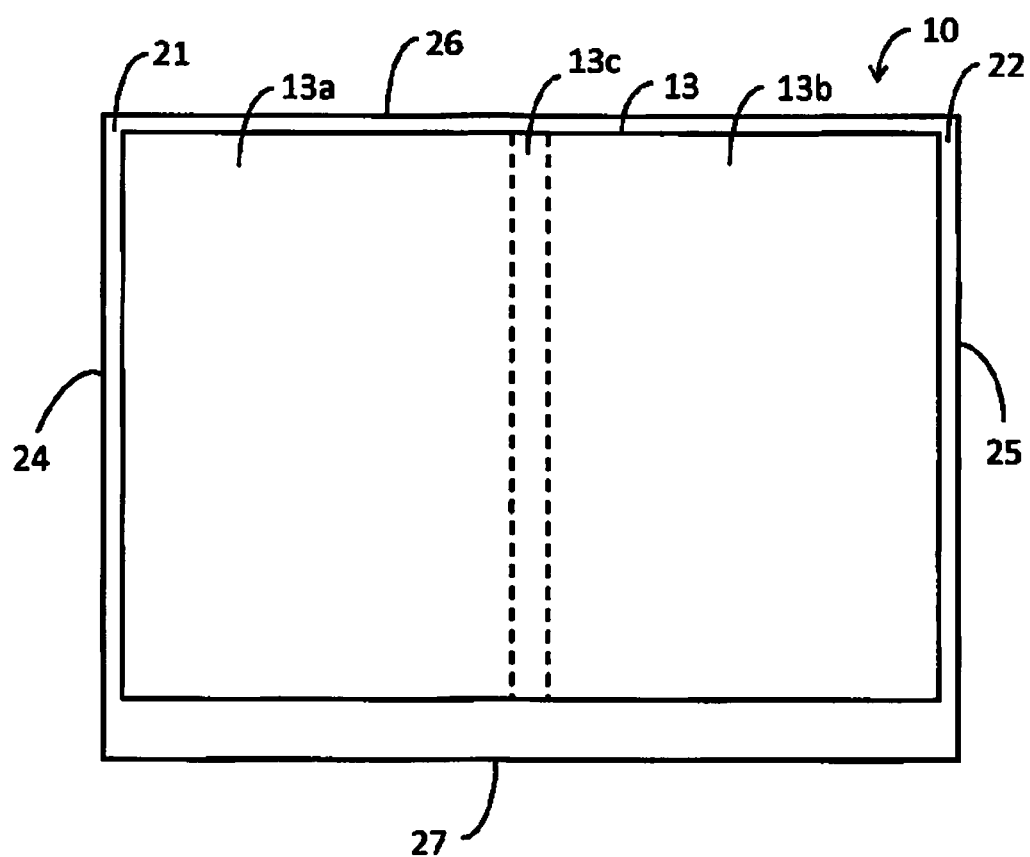
FIG. 3 illustrates the terminal apparatus when viewed toward a display section.

The display section 13 is a display including a first display area 13a and a second display area 13b. The display section 13 is a so-called flexible display that can be folded, as illustrated in FIGS. 2 and 3 and other drawings, which will be referenced later. Flexible displays are disclosed in JP-A-2018-72663 and JP-A-2017-188027 as well. The display section 13 also functions a touch panel that accepts a manipulation by the user. The terminal apparatus 10 having the display section 13 is equivalent to a display apparatus.

The first sensor 14 is composed of at least one sensor that detects the orientation and rotation of the terminal apparatus 10. Specifically, the first sensor 14 is an acceleration sensor or gyro sensor.

The second sensor 15 is composed of at least one sensor that detects the state and rotation of the terminal apparatus 10. The terminal apparatus 10 can take two states, a folded state and an unfolded state. In the folded state, the display section 13 is folded along a boundary between the first display area 13a and the second display area 13b so that first display area 13a and second display area 13b face in opposing directions. In the unfolded state, the first display area 13a and second display area 13b face in the same direction without the display section 13 being folded along the boundary.

The state of the terminal apparatus 10, which is the folded state or unfolded state, is also the state of the display section 13.

The wireless communication section 16 wirelessly communicates with external apparatuses through a public communication line, a wireless local area network (LAN), or the like.

Of course, the structure illustrated in FIG. 1 is just part of the structure of the terminal apparatus 10. The terminal apparatus 10 is composed of, for example, a speaker, a microphone, a camera, a terminal for wired coupling, physical buttons, and various other components that a smartphone and a tablet terminal generally have.

FIG. 2 illustrates how the state of the terminal apparatus 10 changes. The upper portion in FIG. 2 illustrates the terminal apparatus 10 in the unfolded state, and the lower portion in FIG. 2 illustrates the terminal apparatus 10 in the folded state. The enclosure of the terminal apparatus 10 is substantially composed of a first enclosure 21 and a second enclosure 22. Each of the first enclosure 21 and second enclosure 22 is shaped like a flat plate. The structure of the terminal apparatus 10 in FIG. 1 is accommodated or mounted in each of these enclosures. The first enclosure 21 and second enclosure 22 are mutually coupled so as to be rotatable around a hinge 23. When the user rotates the first enclosure 21 or second enclosure 22 around the hinge 23, the user can place the terminal apparatus 10 in the unfolded state or folded state. To easily implement the folded state as illustrated in the lower portion in FIG. 2, a coupling portion of the first enclosure 21 to the hinge 23 and a coupling portion of the second enclosure 22 to the hinge 23 may be formed from a member having flexibility or elasticity.

The display section 13, which is a single continuous flexible display, is mounted on one surface of the flat-plate-like enclosure composed of the first enclosure 21 and second enclosure 22. The display section 13 has a first display area 13a allocated on the first enclosure 21 and a second display area 13b allocated on the second enclosure 22. The display section 13 also has a boundary area 13c, which couples the first display area 13a and second display area 13b together, at a position at which the boundary area 13c opposes the hinge 23. A region including the hinge 23 and boundary area 13c is equivalent to the boundary described above. Although the range of the boundary area 13c is not necessarily clear, a range over which the display section 13 is curved when the terminal apparatus 10 is folded can be called the boundary area 13c.

When the terminal apparatus 10 is in the unfolded state, the first display area 13a and second display area 13b face in the same direction as illustrated in the upper portion in FIG. 2. However, a state in which the first display area 13a and second display area 13b face in the same direction is not limited to a state in which the directions in which they face are exactly the same. For example, even when there is a little difference between the direction in which the first display area 13a faces and the direction in which the second display area 13b faces, the difference may be small enough that the user recognizes that the first display area 13a and second display area 13b face in the same direction. This state may also be interpreted as the state in which the first display area 13a and second display area 13b face in the same direction.

When the terminal apparatus 10 is in the folded state, the first display area 13a and second display area 13b face in opposite directions as illustrated in the lower portion in FIG. 2. In the folded state, a first rear surface 21a of the first enclosure 21 and a second rear surface 21b of the second enclosure 22 face each other, the first rear surface 21a being opposite to the surface on which the display section 13 on the first enclosure 21 is mounted, the second rear surface 21b being opposite to the surface on which the display section 13 on the second enclosure 22 is mounted. A state in which the first display area 13a and second display area 13b face in opposite directions is not limited to a state in which the directions in which they face are exactly opposite. For example, even when an angle formed by the direction in which the first display area 13a faces and the direction in which the second display area 13b faces may slightly deviate from 180 degrees, the deviation may be small enough that the user recognizes that the first display area 13a and second display area 13b face in opposite directions. This state may also be interpreted as the state in which the first display area 13a and second display area 13b face in opposite directions.

FIG. 3 illustrates the terminal apparatus 10 in the unfolded state when viewed toward the display section 13. In FIG. 3, the inside of the display section 13, which is a flexible display, is delimited with dashed lines to define the first display area 13a, boundary area 13c, and second display area 13b. Of course, these dashed lines are not present in actual practice. The four edges of the enclosure of the terminal apparatus 10 shaped like a flat plate are a first edge 24, which is one of the two edges parallel to the longitudinal direction of the boundary area 13c, a second edge 25, which is the other of the two edges parallel to the longitudinal direction of the boundary area 13c, a third edge 26, which is one of the two edges that link the first edge 24 and second edge 25 together, and a fourth edge 27, which is the other of the two edges that link the first edge 24 and second edge 25 together.

When the third edge 26 or fourth edge 27 of the four edges of the enclosure faces downward, that is, in the direction of gravity, when the display section 13 is in the unfolded state, the first display area 13a and second display area 13b are arranged horizontally. In this embodiment, the orientation of the display section 13 in a state in which the first display area 13a and second display area 13b are arranged horizontally in the unfolded state as described above will be referred to as horizontal orientation. The display section 13 in FIG. 3 is in horizontal orientation. When the first edge 24 or second edge 25 of the four edges of the enclosure faces downward, that is, in the direction of gravity, when the display section 13 is in the unfolded state, the first display area 13a and second display area 13b are arranged vertically. In this embodiment, the orientation of the display section 13 in a state in which the first display area 13a and second display area 13b are arranged vertically in the unfolded state as described above will be referred to as vertical orientation.

The horizontal orientation and vertical orientation described above are the horizontal orientation and vertical orientations of the display section 13 and also the horizontal orientation and vertical orientations of the terminal apparatus 10. In the example in the drawing, although depending on the shape of the display section 13, the first edge 24 and second edge 25 are shorter than the third edge 26 and fourth edge 27. Therefore, the display section 13 in horizontal orientation is in landscape orientation, and the display section 13 in vertical orientation is in portrait orientation. In the example in the drawing, the first edge 24 and second edge 25 are longer than half the third edge 26 and fourth edge 27. Therefore, when the third edge 26 or fourth edge 27 faces downward in the folded state, each of the first display area 13a and second display area 13b is in portrait orientation.

The display section 13 may not be a single flexible display mounted across the first enclosure 21 and second enclosure 22, but may be two displays mounted separately on the first enclosure 21 and second enclosure 22. When these two displays are collectively called the display section 13, the display mounted on the first enclosure 21 is equivalent to the first display area 13a, and the display mounted on the second enclosure 22 is equivalent to the second display area 13b. When the first display area 13a and second display area 13b are two separate displays, the boundary area 13c, which is part of the display section 13, is not present, in which case the hinge 23 is just equivalent to the boundary between the first display area 13a and the second display area 13b.

2. Display Control Processing

Figure 4:
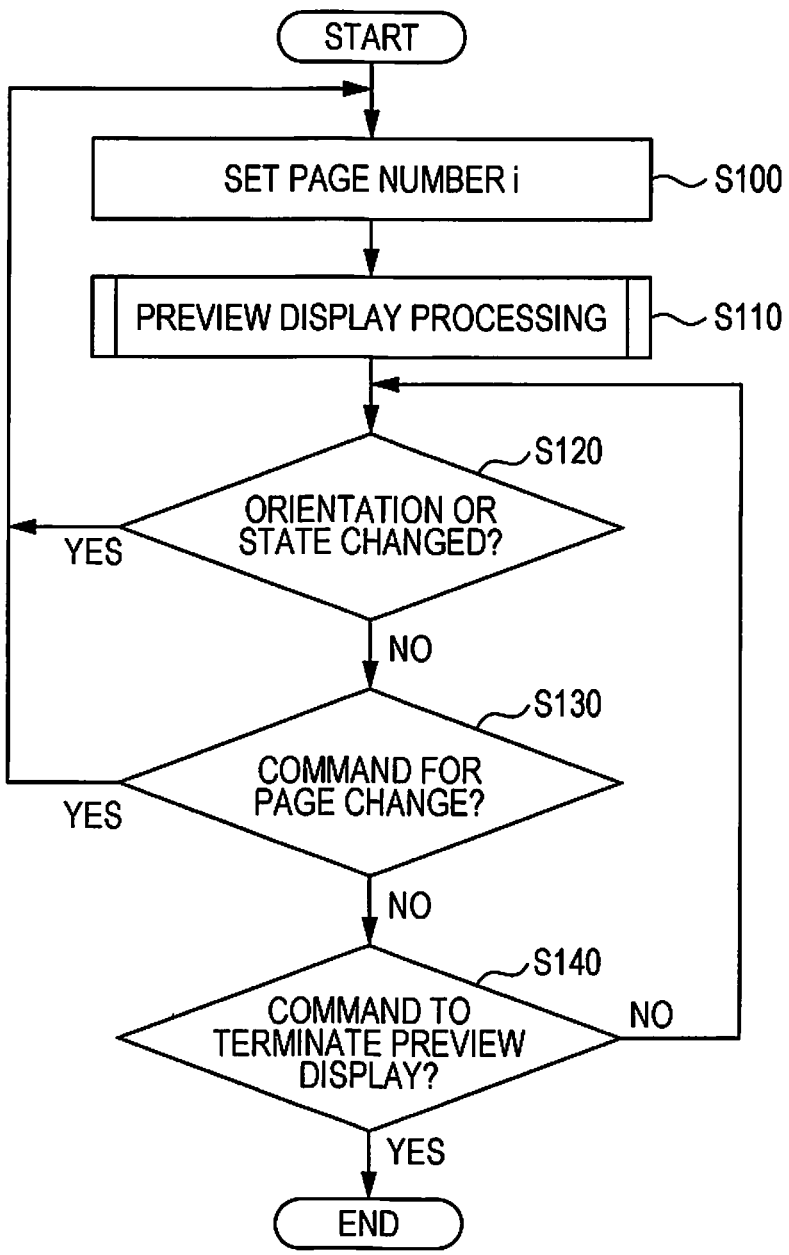
FIG. 4 is a flowchart illustrating display control processing.

FIG. 4 is a flowchart illustrating display control processing executed by the control section 11 according to the display control program 12. The flowchart will be described below by using an example in which a preview of a file having a plurality of pages of images created in page units is displayed on the display section 13 before a printer (not illustrated) prints the file. Each of images in page units will be referred to as a page image. Page images represent documents, photos, computer graphics (CG), and various other contents. When the control section 11 accepts a command to start displaying a preview of an image file through a manipulation by the user, the control section 11 starts the flowchart in FIG. 4.

In step S100, the display control section 12b sets page number i for a page eligible for a preview display. When, for example, the image file is composed of 10 pages of page images, page number i that can be set is a natural number from 1 to 10. In the first step S100 after the flowchart in FIG. 4 has been started, the display control section 12b generally sets i to 1.

In step S110, the display control section 12b execute preview display processing. Step S110 will be described later in detail with reference to FIG. 5 and other drawings. With a certain page image displayed on the display section 13 in step S110, the display control section 12b causes the process to proceed to step S120.

When the orientation or state of the display section 13 has been changed, the deciding section 12a makes an affirmative decision in step S120 and returns to step S100. When the orientation and state of the display section 13 remain unchanged, the deciding section 12a makes a negative decision in step S120 and proceeds to step S130.

The deciding section 12a decides, according to a detection signal output from the second sensor 15, whether the display section 13 is in the unfolded state or folded state. When the display section 13 has been changed from the folded state to the unfolded state or from the unfolded state to the folded state, the deciding section 12a decides that the state of the display section 13 has been changed and returns to step S100.

The second sensor 15 only needs to be a sensor that outputs a detection signal needed to make a decision as to which of the unfolded state or folded state is in progress. The second sensor 15 is disposed in the vicinity of either the first edge 24 of the first rear surface 21a or the second edge 25 of the second rear surface 21b, for example. The second sensor 15 may be structured so that when the first rear surface 21a and second rear surface 21b have faced each other as illustrated in the lower portion in FIG. 2, the second sensor 15 outputs, to the control section 11, a detection signal indicating that the first edge 24 and second edge 25 has come closest to each other, that is, the folded state has been entered.

As another example, the second sensor 15 may be structured so as to output, to the control section 11, a detection signal indicating an angle formed by the first enclosure 21 and second enclosure 22 with the hinge 23 being a boundary between them.

As yet anther example, the terminal apparatus 10 may have a lock mechanism that physically locks the folded state of the terminal apparatus 10. The lock mechanism is manipulated by the user. Then, the second sensor 15 may be structured so that when the lock mechanism is in a locked state in which the state of the terminal apparatus 10 is locked, the second sensor 15 outputs, to the control section 11, a signal indicating that the terminal apparatus 10 is in the folded state.

The deciding section 12a decides, according to the detection signal output from the first sensor 14, whether the display section 13 is in horizontal orientation or vertical orientation. Specifically, when the display section 13 is in the unfolded state, the deciding section 12a decides, according to the output from the first sensor 14, which of the first edge 24, second edge 25, third edge 26, and fourth edge 27 of the terminal apparatus 10 faces downward and thereby decides, according to the decision result, whether the display section 13 is in horizontal orientation or vertical orientation. When the orientation of the display section 13 has been changed from landscape orientation to vertical orientation or from vertical orientation to horizontal orientation, the deciding section 12a decides that the orientation of the display section 13 has been changed and returns to step S100.

As described above, the deciding section 12a decides the orientation and state of the display section 13 according to outputs from the first sensor 14 and second sensor 15. Even when the orientation of the display section 13 is changed while the folded state is maintained, the deciding section 12a makes an affirmative decision in step S120 and returns to step S100. A change in the orientation of the display section 13 with the folded state maintained occurs when the orientation of the boundary is changed from landscape orientation to portrait orientation or from portrait orientation to landscape orientation while the folded state is maintained.

In step S130, when there is a command for a page change, the display control section 12b makes an affirmative decision and returns to step S100. When there is no command to change a page, the display control section 12b makes a negative decision in step S130 and proceeds to step S140. The user can command a page change by manipulating a button, displayed on the display section 13, to advance to next page or go back to the previous page or by making a so-called swipe in which the user slides a finger or the like while it is in contact with the display section 13. When the display control section 12b accepts a command for a page change from the user, the display control section 12b returns from step S130 to step S100. However, when the terminal apparatus 10 is rotated to command a page change, which will be described later with reference to FIGS. 11 to 14, the rotation is recognized as a change in the orientation in step S120 rather than step S130. In this embodiment, making a change from a smaller page number to a larger page number is referred to as advancing to the next page, and making a change from a larger page number to a smaller page number is referred to as going back to the previous page.

In step S100 to which the process has returned from step S120 or S130, the display control section 12b sets page number i to a page number that is the same as or different from the page number that has been set so far according to the change in the orientation of the display section 13, the change having been decided in step S120, or in response to the command for a page change, the command having been recognized in step S130.

When, for example, the display control section 12b recognizes a command to advance to the next page in step S130 while a page image with page number i is displayed on the display section 13, the display control section 12b sets, in step S100, a number obtained by adding 1 to page number i set in previous step S100 as new page number i. When the display control section 12b recognizes a command to go back to the previous page in step S130 while the page image with page number i is displayed on the display section 13, the display control section 12b sets, in step S100, a number obtained by subtracting 1 from page number i set in previous step S100 as new page number i. When, for example, the display control section 12b recognizes a command to advance to the next page in step S130 while the page image with page number i and the page image with page number i+1 are displayed on the display section 13, the display control section 12b sets, in step S100, a number obtained by adding 2 to page number i set in previous step S100 as new page number i. How page number i is set in step S100 will be additionally described with reference to FIGS. 11 to 14.

In step S140, the display control section 12b decides whether a command to terminate the preview display of the image file has been accepted, the command being issued by a manipulation by the user. When a termination command has been accepted, the display control section 12b makes an affirmative decision and terminates the processing in the flowchart in FIG. 4. When a termination command has not been accepted, the display control section 12b makes a negative decision in step S140 and goes back to a decision in step S120. A termination command is, for example, a print start command by which the preview display is terminated and then the printing is started or a cancel command by which the preview display is terminated and then a setting screen on which print settings are made is displayed again.

Figure 5:
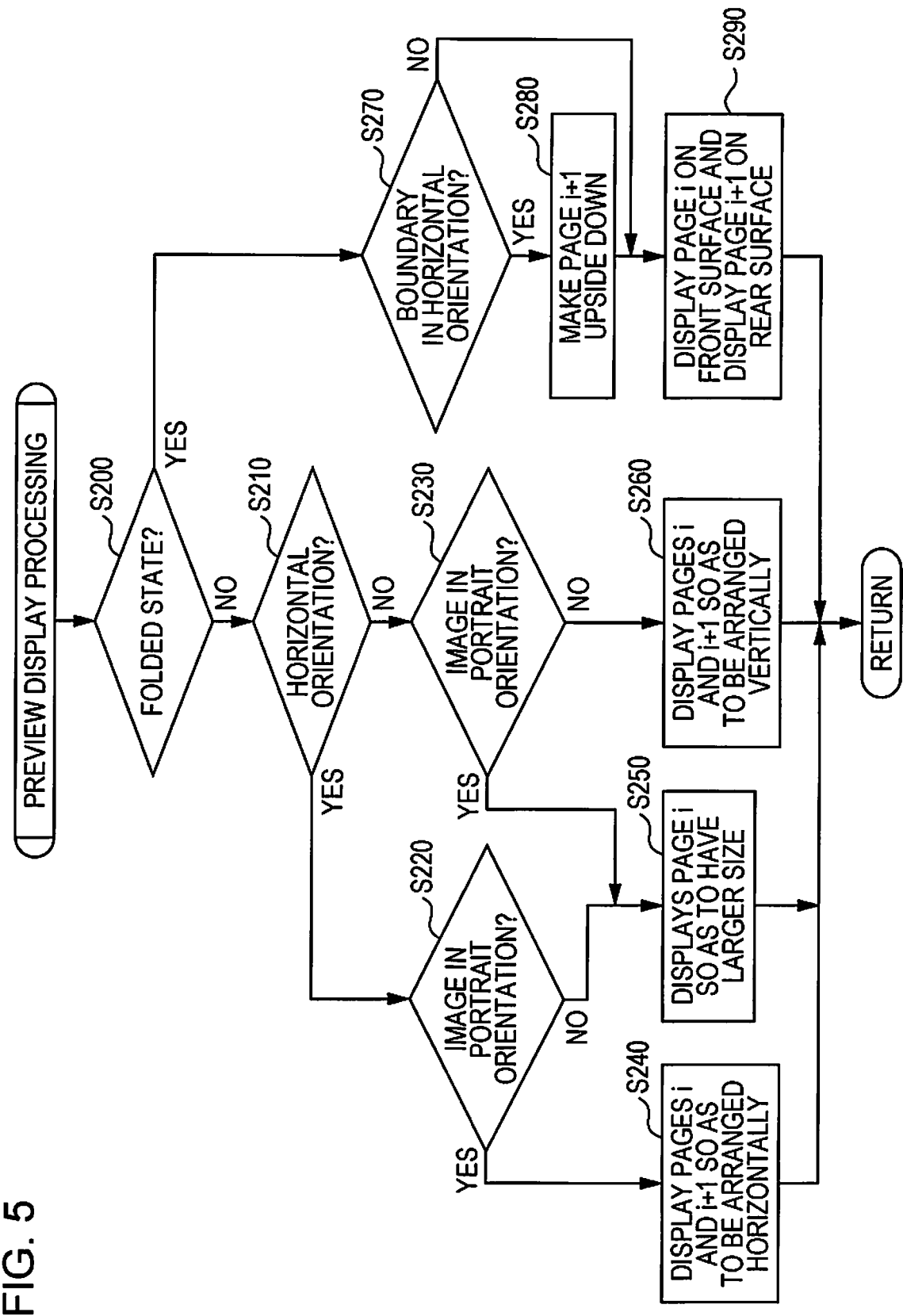
FIG. 5 is a flowchart illustrating details of step S110.

FIG. 5 is a flowchart illustrating details of step S110.

In steps S200, S210, and S270, the display control section 12b branches processing according to the current decision result made by the deciding section 12a as to the orientation and state of the display section 13.

When the display control section 12b decides in step S200 that the display section 13 is in the folded state, the display control section 12b makes an affirmative result and proceeds to step S270. When the display section 13 is not in the folded state, that is, in the unfolded state, the display control section 12b makes a negative result and proceeds to step S210.

When the display control section 12b decides, in step S210, that the display section 13 is in horizontal orientation, the display control section 12b makes an affirmative result and proceeds to step S220. When the display section 13 is not in horizontal orientation, that is, in vertical orientation, the display control section 12b makes a negative result and proceeds to step S230.

In step S220, the display control section 12b decides whether an image to be displayed on the display section 13 is in portrait orientation or in landscape orientation. An image that is in portrait orientation is in a state in which the longitudinal direction of the image is oriented vertically. An image that is in landscape orientation is in a state in which the longitudinal direction of the image is oriented horizontally. When the image is in portrait orientation, the display control section 12b makes an affirmative result in step S220 and proceeds to step S240. When the image is in landscape orientation, the display control section 12b makes a negative result in step S220 and proceeds to step S250. The image to be displayed on the display section 13 refers to the page image with page number i, a page image with page number i+1, or both. In step S220, the display control section 12b makes a decision for the page image with page number i or the page image with page number i+1 as to whether the page image is in portrait orientation or landscape orientation, and branches the processing accordingly.

In step S230, the display control section 12b makes a decision as in step S220. When the image is in portrait orientation, the display control section 12b makes an affirmative result in step S230 and proceeds to step S250. When the image is in landscape orientation, the display control section 12b makes a negative result in step S230 and proceeds to step S260.

Step S240 corresponds to a first case in which the image is in portrait orientation and the display section 13 is in horizontal orientation.

Step S250 to which the process proceeds from step S230 is corresponds to a second case in which the image is in portrait orientation and the display section 13 is in vertical orientation.

Step S260 corresponds to a third case in which the image is in landscape orientation and the display section 13 is in vertical orientation.

Step S250 to which the process proceeds from step S220 corresponds to a fourth case in which the image in landscape orientation and the display section 13 is in horizontal orientation.

In step S240, the display control section 12b displays the page image with page number i and the page image with page number i+1 on the display section 13 so that the page images are arranged horizontally. The page image with page number i is equivalent to a first page image representing a first page. The first page is one page identified by the current page number i. The page image with page number i+1 is equivalent to a second page image representing a second page. The second page may be interpreted as the next page after the first page. In FIG. 5 and other drawings, the page image with page number i is represented as page i and the page image with page number i+1 is represented as page i+1.

In step S260, the display control section 12b displays the page image with page number i and the page image with page number i+1 on the display section 13 so that the page images are arranged vertically.

In step S250, the display control section 12b displays the page image with page number i on the display section 13 so that the page image has a size larger than the display in step S240 or S260. Specifically, in step S250 to which the process proceeds from step S230, the display control section 12b displays the page image with page number i on the display section 13 so that the page image has a size larger than the display in step S240. In step S250 to which the process proceeds from step S220, the display control section 12b displays the page image with page number i on the display section 13 so that the page image has a size larger than the display in step S260.

In step S250, the display control section 12b may display the page image with page number i+1 on the display section 13 so that the page image has a size larger than the display in step S240 or S260, instead of the page image with page number i.

Figure 6A:
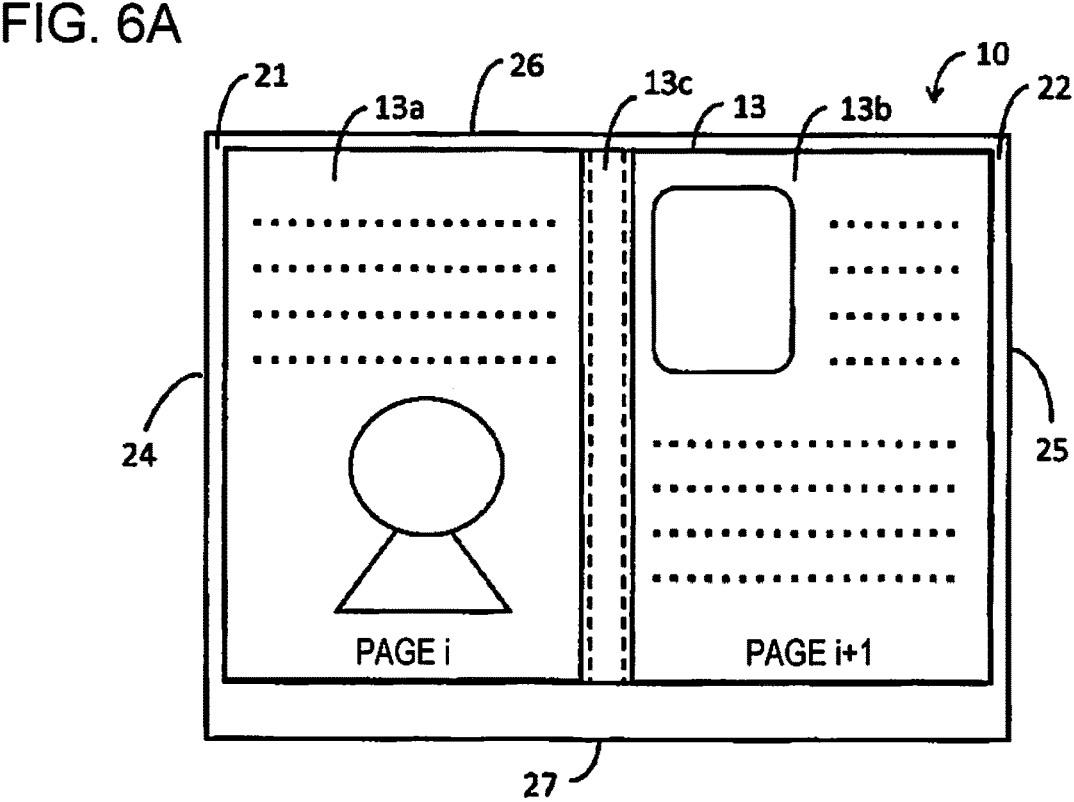
FIG. 6A illustrates a first case in which images for two images are displayed.

FIG. 6A illustrates the first case, that is, a case in which, in step S240, the page image with page number i and the page image with page number i+1 are displayed on the display section 13 so that the page images are arranged horizontally. According to FIG. 6A, in step S240, the page image with page number i, which is in portrait orientation, is displayed in the first display area 13a of the display section 13 in horizontal orientation and the page image with page number i+1, which is also in portrait orientation, is displayed in the second display area 13b of the display section 13 in horizontal orientation. In the example in FIG. 6A, the fourth edge 27 of the terminal apparatus 10 faces downward. Of course, however, the third edge 26 may face downward depending on how the user holds the terminal apparatus 10. When the third edge 26 of the terminal apparatus 10 faces downward, the display in step S240 changes so that the page image with page number i, which is in portrait orientation, is displayed in the second display area 13b of the display section 13 in horizontal orientation and the page image with page number i+1, which is also in portrait orientation, is displayed in the first display area 13a of the display section 13 in horizontal orientation.

Figure 6B:
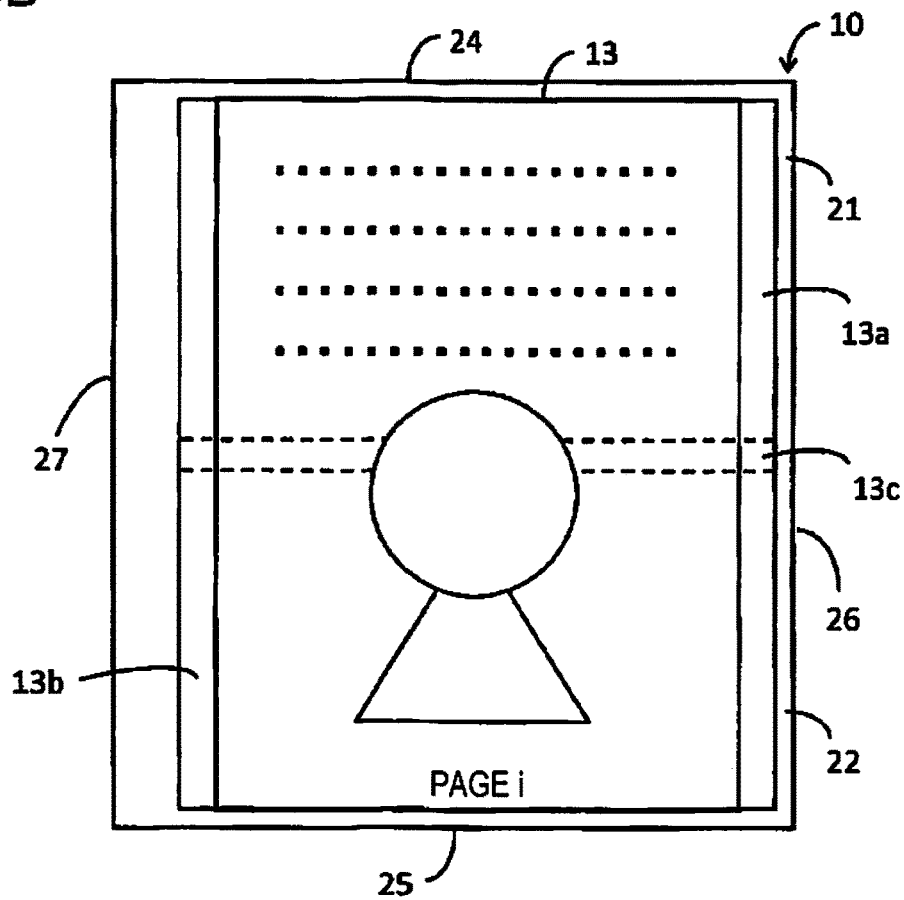
FIG. 6B illustrates a second case in which an image for one page is displayed.

FIG. 6B illustrates the second case, that is, a case in which, in step S250 to which the process proceeds from step S230, the page image with page number i is displayed on the display section 13. According to FIG. 6B, in step S250 to which the process proceeds from step S230, the page image with page number i, which is in portrait orientation, is displayed across the first display area 13a and second display area 13b of the display section 13 in vertical orientation. As seen from a comparison between FIGS. 6A and 6B, when the page image with page number i is displayed across the first display area 13a and second display area 13b, the size of the page image is larger than when the page image is displayed only in the first display area 13a.

Figure 7A:
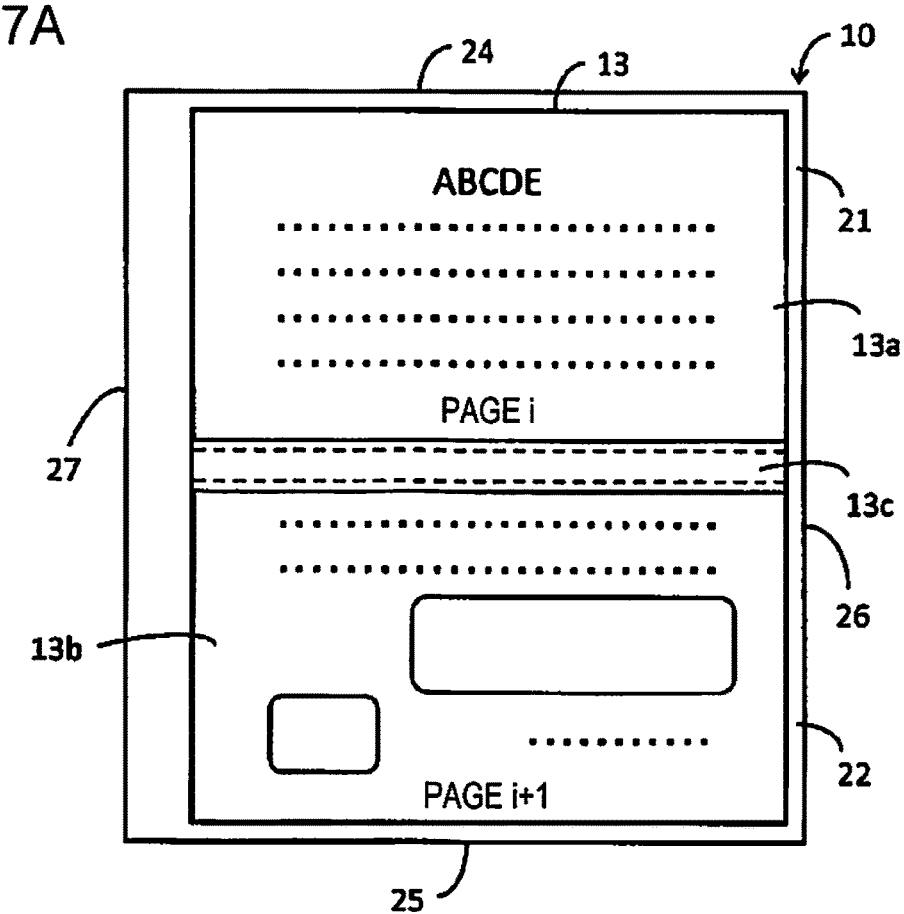
FIG. 7A illustrates a third case in which images for two images are displayed.

FIG. 7A illustrates the third case, that is, a case in which, in step S260, the page image with page number i and the page image with page number i+1 are displayed on the display section 13 so that the page images are arranged vertically. According to FIG. 7A, in step S260, the page image with page number i, which is in landscape orientation, is displayed in the first display area 13a of the display section 13 in vertical orientation and the page image with page number i+1, which is also in landscape orientation, is displayed in the second display area 13b of the display section 13 in vertical orientation. In the example in FIG. 7A, the second edge 25 of the terminal apparatus 10 faces downward. Of course, however, the first edge 24 may face downward depending on how the user holds the terminal apparatus 10. When the first edge 24 of the terminal apparatus 10 faces downward, the display in step S260 changes so that the page image with page number i, which is in landscape orientation, is displayed in the second display area 13b of the display section 13 in vertical orientation and the page image with page number i+1, which is also in landscape orientation, is displayed in the first display area 13a of the display section 13 in vertical orientation.

Figure 7B:
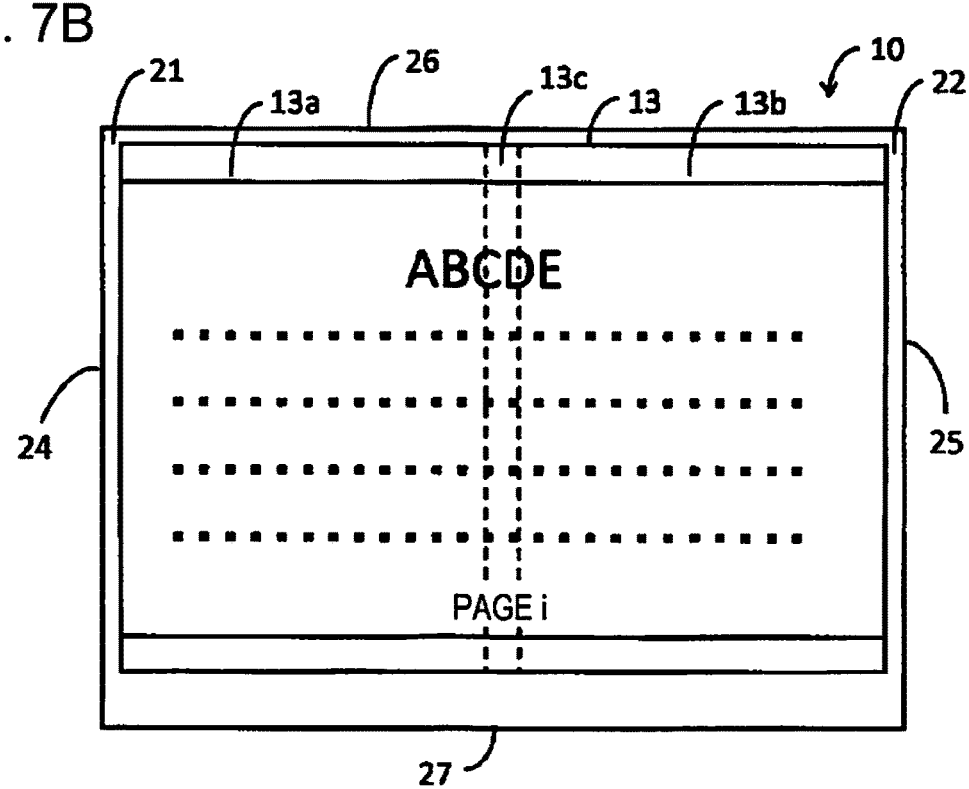
FIG. 7B illustrates a fourth case in which an image for one page is displayed.

FIG. 7B illustrates the fourth case, that is, a case in which, in step S250 to which the process proceeds from step S220, the page image with page number i is displayed on the display section 13. According to FIG. 7B, in step S250 to which the process proceeds from step S220, the page image with page number i, which is in landscape orientation, is displayed across the first display area 13a and second display area 13b of the display section 13 in horizontal orientation. As seen from a comparison between FIGS. 7A and 7B, when the page image with page number i is displayed across the first display area 13a and second display area 13b, the size of the page image is larger than when the page image is displayed only in the first display area 13a.

When the display section 13 is structured so as to have the boundary area 13c between the first display area 13a and the second display area 13b as illustrated in FIGS. 2 and 3 and other drawings, the display control section 12b may or may not display part of a page image in the boundary area 13c in steps S240, S250, and S260. When an image for one page is to be displayed across the first display area 13a and second display area 13b in step S250, it is natural and preferable for the image for one page to be displayed across the first display area 13a, boundary area 13c, and second display area 13b.

In step S270 to which the process proceeds from step S200, the display control section 12b decides whether the boundary is in horizontal orientation. When the boundary is in horizontal orientation, the display control section 12b makes an affirmative result in step S270 and proceeds to step S280. When the boundary is in vertical orientation, the display control section 12b makes a negative result in step S270 and proceeds to step S290. When the first edge 24 and second edge 25 of the terminal apparatus 10 face downward or upward, the display control section 12b decides that the boundary is in horizontal orientation and proceeds to step S280. When the third edge 26 or fourth edge 27 of the terminal apparatus 10 faces downward or upward, the display control section 12b decides that the boundary is in vertical orientation, in which case the display control section 12b skips step S280 and proceeds to step S290.

In step S280, the display control section 12b makes the page image with page number i+1 upside down, that is, rotates the page image with page number i+1 through 180 degrees. Accordingly, the top and bottom are reversed between the page image with page number i and the page image with page number i+1.

In step S290, the display control section 12b displays the page image with page number i on the front surface of the display section 13, and also displays the page image with page number i+1 on the rear surface of the display section 13. The front surface of the display section 13 is an area, first display area 13a or second display area 13b, that is assumed to face the user. The rear surface of the display section 13 is an area, first display area 13a or second display area 13b, that is not assumed to face the user. For example, the display control section 12b analyzes a picture taken by a camera (not illustrated) provided for the terminal apparatus 10 to decide which of the first display area 13a and second display area 13b is the front surface and which of them is the rear surface. After having made a decision as for the front surface and rear surface in step S290, the display control section 12b maintains this decision result until the display control section 12b makes a decision as for the front surface and rear surface again in step S290 in step S110. Alternatively, the display control section 12b may decide in step S290 that the first display area 13a is always the front surface and the second display area 13b is always the rear surface.

Figure 8:
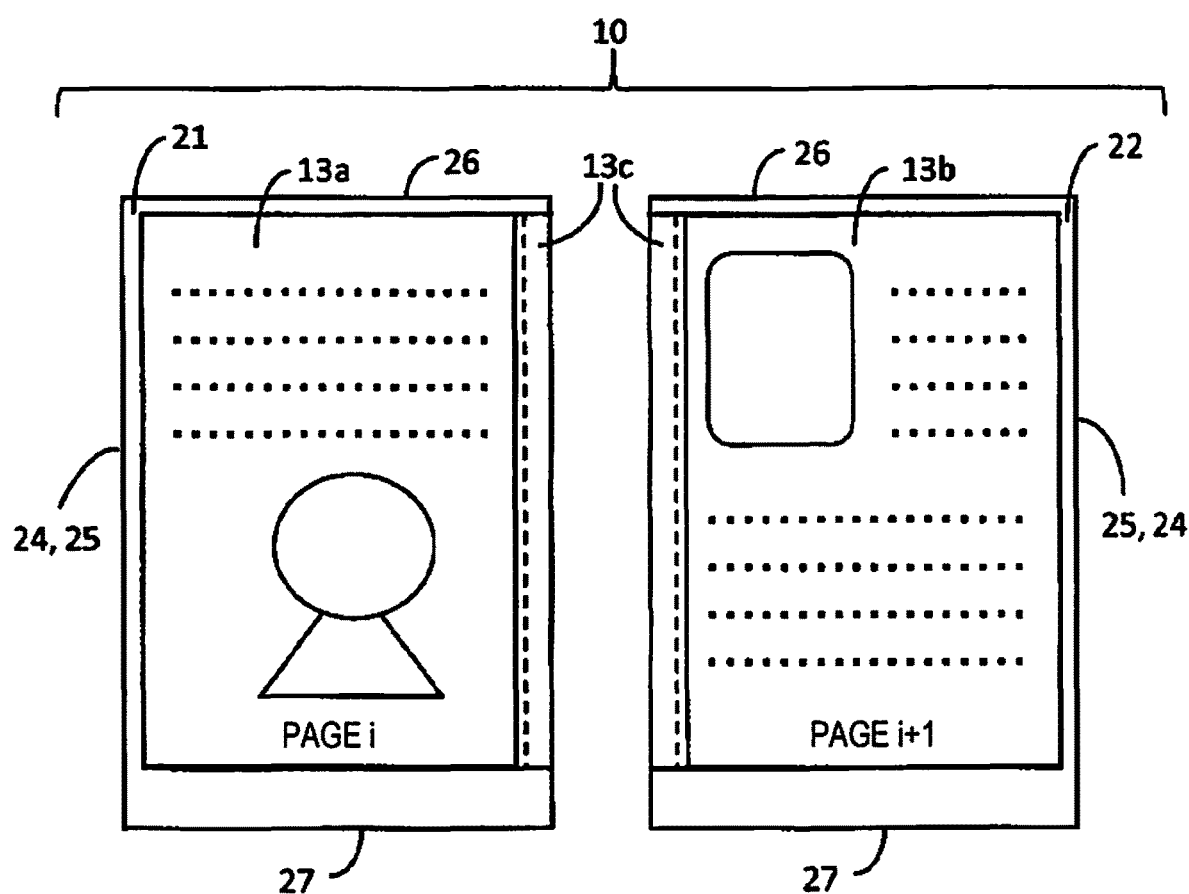
FIG. 8 illustrates images, for two pages, that are displayed in step S290 executed without passing through step S280.
Figure 9:
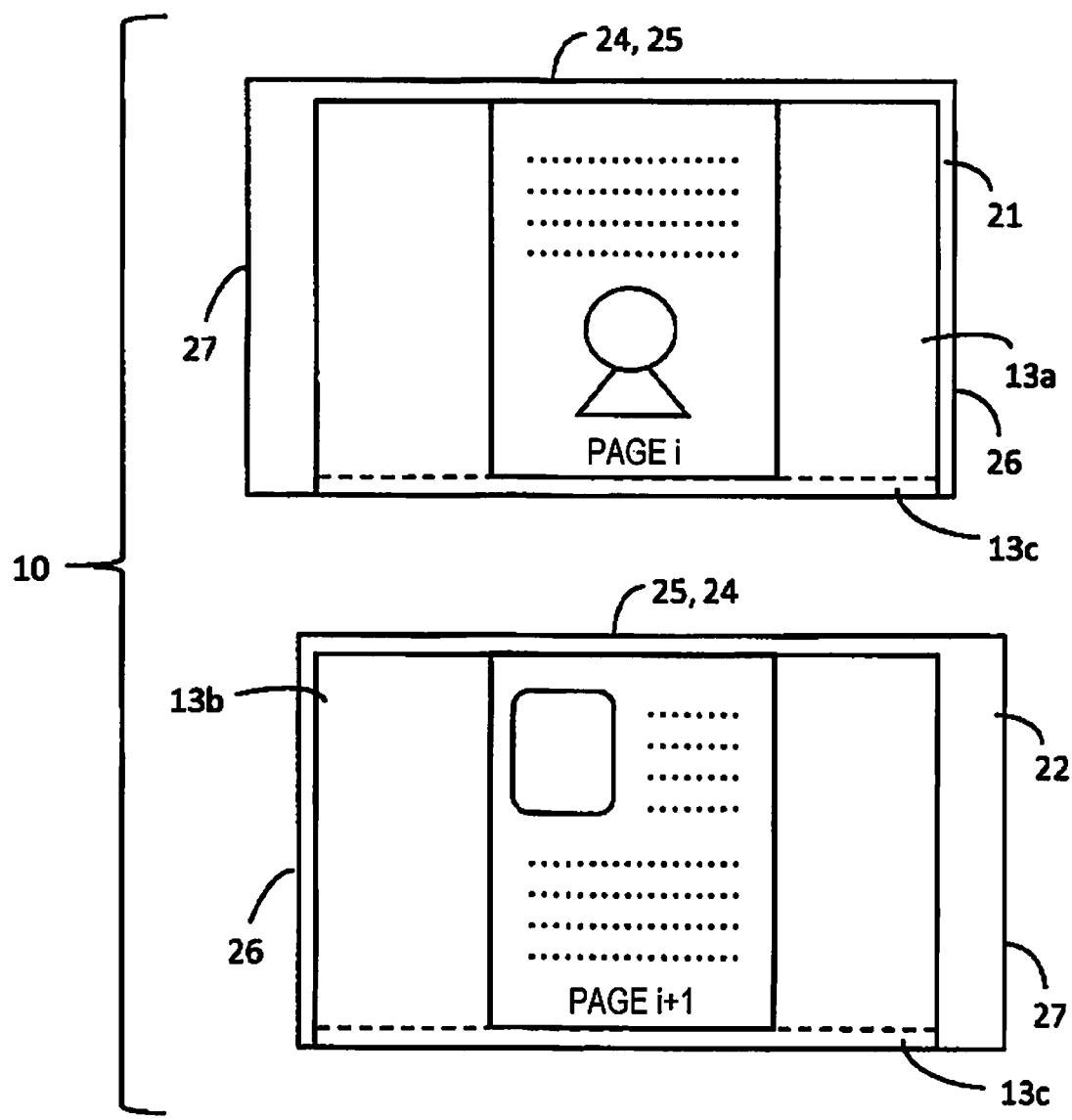
FIG. 9 illustrates images, for two pages, that are displayed in step S290 executed after step S280 has been executed.

FIG. 8 illustrates the page image with page number i and the page image with page number i+1 that are displayed on the display section 13 in step S290 to which the process proceeds from step S270 without passing through step S280. In FIG. 8 and FIG. 9 referenced later, it will be assumed as an example that the first display area 13a is the front surface of the display section 13 and the second display area 13b is the rear surface of the display section 13. The terminal apparatus 10 in FIG. 8 is in the folded state with the boundary oriented vertically. In FIG. 8, the first enclosure 21 when viewed toward the first display area 13a is illustrated on the left side and the second enclosure 22 when viewed toward the second display area 13b is illustrated on the right side.

In FIG. 8, the page image with page number i is displayed in the first display area 13a and the page image with page number i+1 is displayed in the second display area 13b. In step S290, the display control section 12b displays the page image with page number i and the page image with page number i+1 at the same position on the front surface and rear surface of the display section 13. The same position referred to here is the same position when the surfaces of the first display area 13a and second display area 13b of the display section 13 in the folded state are viewed perpendicularly. Specifically, the display control section 12b displays one of the page image with page number i and the page image with page number i+1 in one of the first display area 13a and second display area 13b and displays the other of the page image with page number i and the page image with page number i+1 in the other of the first display area 13a and second display area 13b so that a match is made between the position of the page image with page number i and the page image with page number i+1 when the surfaces of the first display area 13a and second display area 13b of the display section 13 in the folded state are viewed perpendicularly. The display control section 12b recognizes a correspondence in advance between pixels on the front surface and pixels on the rear surface, the pixels being at the same positions on the front surface and rear surface when the display section 13 is in the folded state.

Assuming that the page image with page number i and the page image with page number i+1 have, for example, different sizes or different length-to-width ratios, it may not be possible to make a complete match between the position of the page image with page number i and the position of the page image with page number i+1 on the front surface and rear surface of the display section 13. In step S290, therefore, the display control section 12b displays the page image with page number i and the page image with page number i+1 so that the position of the page image with page number i and the position of the page image with page number i+1 coincide with each other on the front surface and rear surface of the display section 13.

FIG. 9 illustrates the page image with page number i and the page image with page number i+1 that are displayed on the display section 13 in step S290 to which the process proceeds from step S270 through step S280. The terminal apparatus 10 in FIG. 9 is in the folded state with the boundary oriented horizontally. In FIG. 9, the first enclosure 21 when viewed toward the first display area 13a is illustrated on the upper side and the second enclosure 22 when viewed toward the second display area 13b is illustrated on the lower side.

In FIG. 9, the page image with page number i is displayed in the first display area 13a and the page image with page number i+1 is displayed in the second display area 13b. When the terminal apparatus 10 is in the folded state with the boundary oriented horizontally, the top and bottom are reversed between the first display area 13a and second display area 13b of the display section 13. Therefore, the top and bottom are reversed between the page image with page number i and the page image with page number i+1 in step S280 before step S290 is executed. As a result, the page image with page number i and the page image with page number i+1 can be displayed so that the top-bottom directions of the page image with page number i and the page image with page number i+1 match. In step S290 to which the process proceeds from step S270 through step S280 as well, the display control section 12b displays the page image with page number i and the page image with page number i+1 so that the positions of these page images match between the front surface and rear surface of the display section 13, as in step S290 to which the process proceeds from step S270 without passing through step S280.

In step S280, the display control section 12b may makes the page image with page number i upside down instead of making the page image with page number i+1 upside down.

With page images displayed on the display section 13 in any one of steps S240, S250, S260, and S290, the display control section 12b causes the process to proceed to step S120 in FIG. 4.

Display control processing will be further described below.

3. Processing when Pages are Oriented in Different Longitudinal Directions

The page image with page number i and the page image with page number i+1 may be oriented in different longitudinal directions. Specifically, the page image with page number i may be in portrait orientation and the page image with page number i+1 is in landscape orientation. Conversely, the page image with page number i may be in landscape orientation and the page image with page number i+1 may be in portrait orientation. In view of this situation, when the page image with page number i and the page image with page number i+1 are oriented in different longitudinal directions, the display control section 12b decides which of the first to fourth cases holds depending on whether the page image with page number i is in portrait orientation or in landscape orientation and whether the display section 13 is in horizontal orientation or in vertical orientation. Specifically, when the page image with page number i and the page image with page number i+1 are oriented in different longitudinal directions, the display control section 12b braches the process in steps S220 and S230 in FIG. 5 depending on whether the page image with page number i is in portrait orientation or in landscape orientation.

For example, it will be assumed that the page image with page number i is in portrait orientation and that the page image with page number i+1 is in landscape orientation. Then, since the page image with page number i is in portrait orientation, the display control section 12b makes an affirmative result in step S220 and proceeds to step S240, in which the display control section 12b displays, on the display section 13, the page image with page number i, which is in portrait orientation, and the page image with page number i+1, which is in landscape orientation, so that the page images are arranged horizontally. More specifically, in step S240, the display control section 12b displays the page image with page number i, which is in portrait orientation, in the first display area 13a of the display section 13 in horizontal orientation, and also displays the page image with page number i+1, which is in landscape orientation, in the second display area 13b of the display section 13 in horizontal orientation.

For example, it will also be assumed that the page image with page number i is in landscape orientation and that the page image with page number i+1 is in portrait orientation. Then, since the page image with page number i is in landscape orientation, the display control section 12b makes a negative result in step S230 and proceeds to step S260, in which the display control section 12b displays, on the display section 13, the page image with page number i, which is in landscape orientation, and the page image with page number i+1, which is in portrait orientation, so that the page images are arranged vertically. More specifically, in step S260, the display control section 12b displays the page image with page number i, which is in landscape orientation, in the first display area 13a of the display section 13 in vertical orientation, and also displays the page image with page number i+1, which is in portrait orientation, in the second display area 13b of the display section 13 in vertical orientation.

4. Processing when Different Pages have Different Sizes

When, in the first case or third case, the page image with page number i and the page image with page number i+1 have different sizes, the display control section 12b may display the page image with a smaller size of these page images in part of one of the first display area 13a and second display area 13b, and may also display the page image with a larger size of these page images across the remaining area of the one of the first display area 13a and second display area 13b and the other of the first display area 13a and second display area 13b.

Figure 10A:
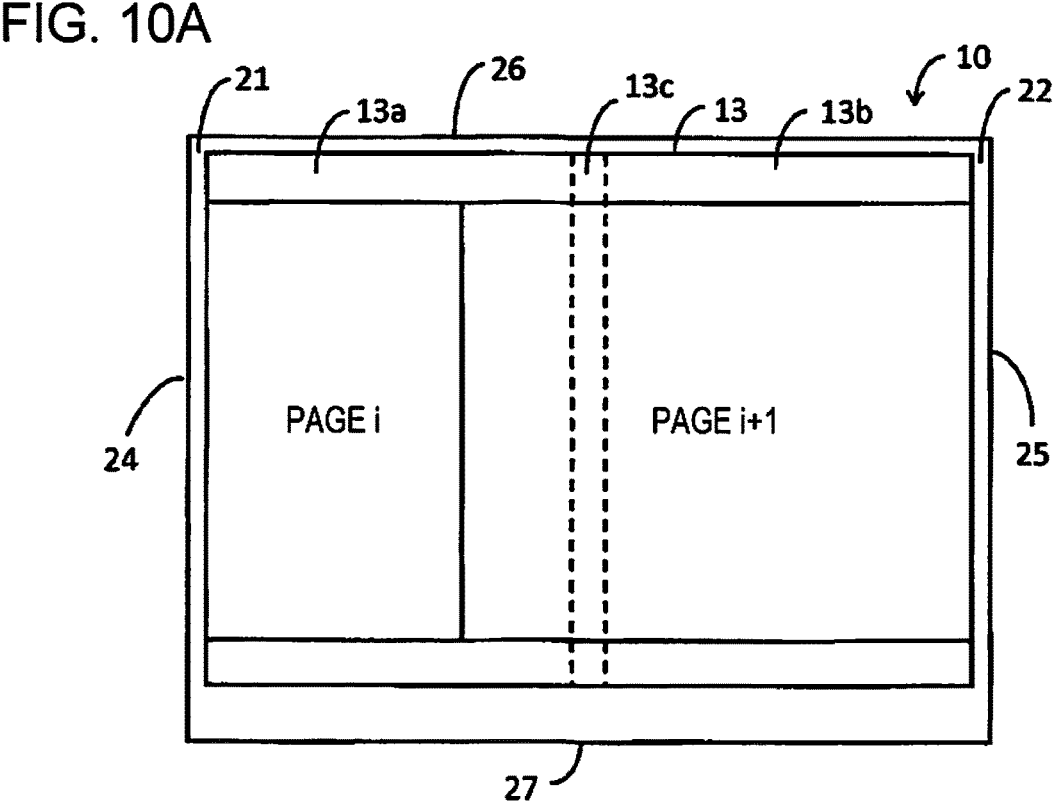
FIG. 10A illustrates images, for two pages, that have different sizes, the images being displayed so that the images are arranged horizontally.
Figure 10B:
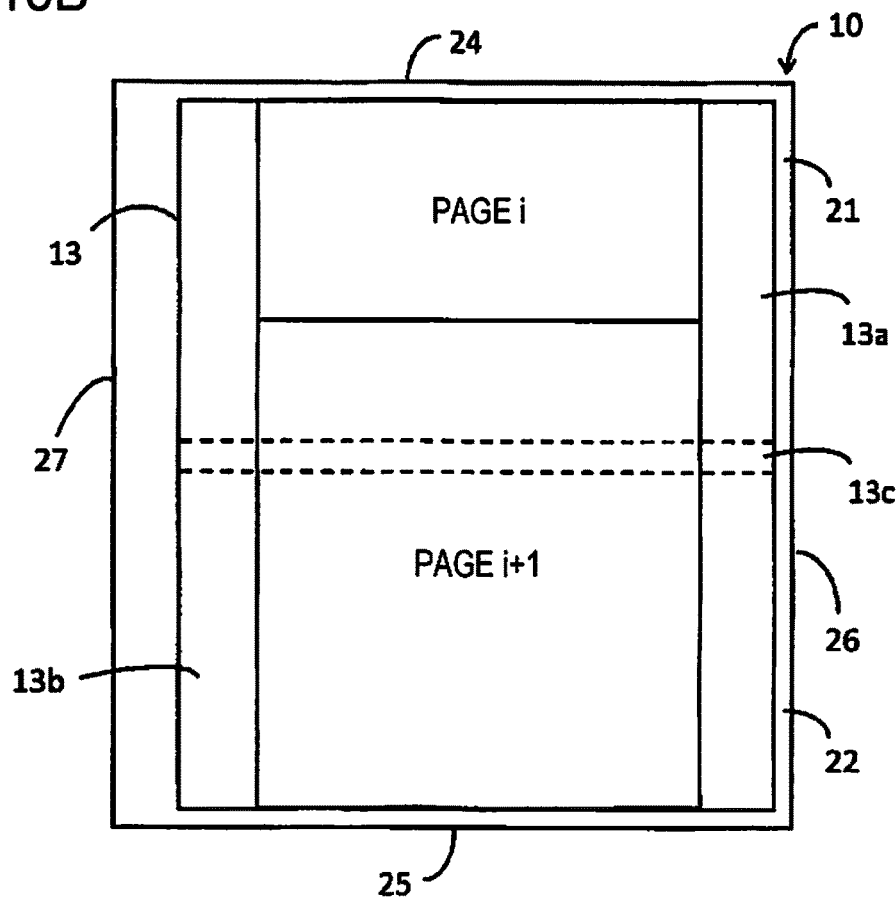
FIG. 10B illustrates images, for two pages, that have different sizes, the images being displayed so that the images are arranged vertically.

FIGS. 10A and 10B illustrates how the page image with page number i and the page image with page number i+1, the page images having different sizes, are displayed on the display section 13.

For example, it will be assumed that the page image with page number i is in A4 size and is in portrait orientation and that the page image with page number i+1 is in A3 size and is in landscape orientation. Then, since the page image with page number i is in portrait orientation, the display control section 12b makes an affirmative result in step S220 and proceeds to step S240, in which the display control section 12b displays, on the display section 13, the page image with page number i, which is in portrait orientation, and the page image with page number i+1, which is in landscape orientation, so that the page images are arranged horizontally. In the example in FIG. 10A, the display control section 12b displays the page image with page number i, which has a smaller size, in part of the first display area 13a of the display section 13 in horizontal orientation, and also displays the page image with page number i+1, which has a larger size, across the remaining area of the first display area 13a and the second display area 13b of the display section 13 in horizontal orientation.

For example, it will also be assumed that the page image with page number i is in A4 size and is in landscape orientation and that the page image with page number i+1 is in A3 size and is in portrait orientation. Then, since the page image with page number i is in landscape orientation, the display control section 12b makes a negative result in step S230 and proceeds to step S260, in which the display control section 12b displays, on the display section 13, the page image with page number i, which is in landscape orientation, and the page image with page number i+1, which is in portrait orientation, so that the page images are arranged vertically. In the example in FIG. 10B, the display control section 12b displays the page image with page number i, which has a smaller size, in part of the first display area 13a of the display section 13 in vertical orientation, and also displays the page image with page number i+1, which has a larger size, across the remaining area of the first display area 13a and the second display area 13b of the display section 13 in vertical orientation.

As described above, in steps S240 and S260, the display control section 12b displays a page image with a smaller size in part of one of the first display area 13a and second display area 13b, and also displays a page image with a larger size in the remaining area of the one of the first display area 13a and second display area 13b and the other of the first display area 13a and second display area 13b.

5. Page Change

In this embodiment, by rotating the terminal apparatus 10, the user can change the page being displayed. Specifically, to change the page, the user rotates the terminal apparatus 10 in the same plane while supporting the terminal apparatus 10. Here, rotation in the same plane refers to rotation in a plane that includes the display section 13 in the unfolded state, that is, the first display area 13a and second display area 13b, the plane being in parallel to or substantially parallel to the vertical direction. However, in consideration that the user manually rotates the terminal apparatus 10, rotation in the same plane should not be restricted to rotation in exactly the same plane. Therefore, when rotation is in the same plane to the extent that the deciding section 12a decides that the rotation is in almost the same plane according to the detection result from the first sensor 14, this type of rotation will be referred to as rotation in the same plane.

In the description below, it will be assumed that when the terminal apparatus 10 is rotated clockwise in the same plane, the display control section 12b advances to the next page and that when the terminal apparatus 10 is rotated counterclockwise in the same plane, the display control section 12b goes back to the previous page. However, when the terminal apparatus 10 is rotated counterclockwise, the display control section 12b may advance to the next page, and when the terminal apparatus 10 is rotated clockwise, the display control section 12b may go back to the previous page. The rotation of the terminal apparatus 10 in the unfolded state is synonymous with the rotation of the display section 13 in the unfolded state.

Figure 11:
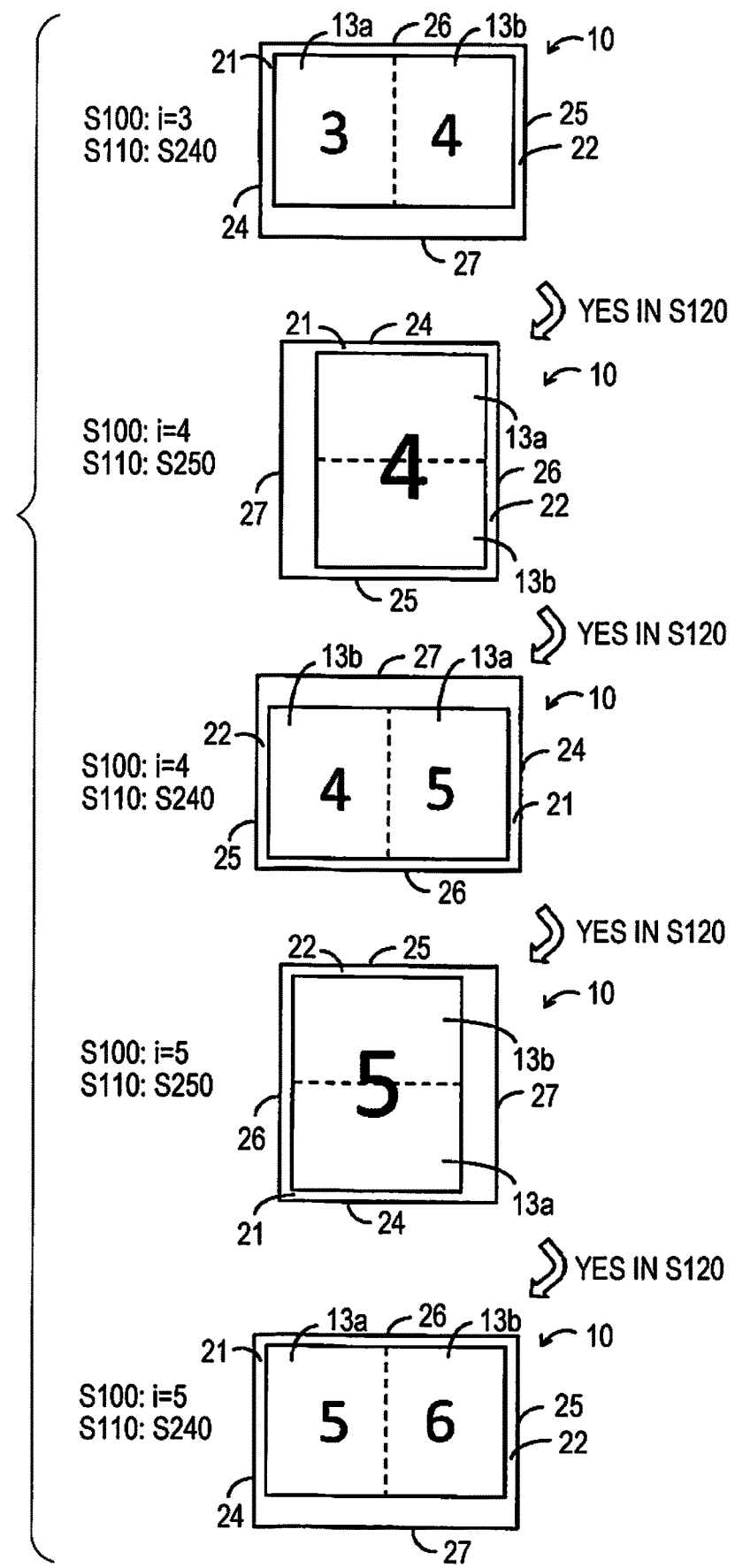
FIG. 11 illustrates how the first case and second case are repeated when the terminal apparatus in an unfolded state is rotated clockwise in the same plane.

FIG. 11 illustrates how the first case and second case are repeated when the terminal apparatus 10 in the unfolded state is rotated in the same plane. In FIG. 11, the terminal apparatus 10 is rotated clockwise through 90 degrees four times, resulting in a rotation of 360 degrees.

It will be assumed that page number i is set to 3 in step S100 at a certain timing, as illustrated at the top in FIG. 11. In step S110 immediately after step S100, decisions are made in steps S200, S210, and S220 in that order and then step S240 is executed. Specifically, in the example at the top in FIG. 11, in step S240, the display control section 12b displays a page image with a page number of 3, the page image being in portrait orientation, in the first display area 13a, and also displays a page image with a page number of 4, which is the next page number after the page number 3, the page image being in portrait orientation, in the second display area 13b.

In FIGS. 11 to 14, the display section 13 is simply illustrated with the boundary area 13c omitted. Also in FIGS. 11 to 14, 3, 4, or another number indicated in each of the first display area 13a and second display area 13b represents the page number of the page image displayed in the relevant display area. Also in FIGS. 11 to 14, the number indicated in each of the first display area 13a and second display area 13b is relatively reduced or enlarged to distinguish between a scene in which step S240 or S260 is being executed and a scene in which step S250 for displaying a page image with a larger size than in step S240 or S260 is being executed.

When the user rotates the terminal apparatus 10 clockwise through 90 degrees while executing step S240 illustrated at the top in FIG. 11, the deciding section 12a recognizes that the orientation of the display section 13 has been changed from horizontal orientation to vertical orientation. Therefore, the deciding section 12a makes an affirmative decision in step S120 and returns to step S100. When the display section 13 is rotated clockwise and its orientation is thereby changed to vertical orientation while step S240 is in progress, the display control section 12b adds 1 to page number i that has been set so far and sets the resulting page number as new page number i in step S100.

Therefore, in step S100 at the timing illustrated at the second from the top in FIG. 11, page number i is set to 4. In step S110 immediately after step S100, decisions are made in steps S200, S210, and S230 in that order and then step S250 is executed. Specifically, in the example at the second from the top in FIG. 11, in step S250, the display control section 12b displays the page image with the page number 4, the page image being in portrait orientation, across the first display area 13a and second display area 13b in such a way that the page image has a larger size than in step S240.

When the user rotates the terminal apparatus 10 clockwise through 90 degrees while executing step S250 illustrated at the second from the top in FIG. 11, the deciding section 12a recognizes that the orientation of the display section 13 has been changed from vertical orientation to horizontal orientation. Therefore, the deciding section 12a makes an affirmative decision in step S120 and returns to step S100. When the display section 13 is rotated clockwise and its orientation is thereby changed to horizontal orientation while step S250 is in progress in the second case, the display control section 12b sets, in step S100, the same page number i as page number i that has been set so far.

Therefore, in step S100 at the timing illustrated at the third from the top in FIG. 11, page number i is set to 4. In step S110 immediately after step S100, decisions are made in steps S200, S210, and S220 in that order and then step S240 is executed. Specifically, in the example at the third from the top in FIG. 11, in step S240, the display control section 12b displays the page image with the page number 4, the page image being in portrait orientation, in the second display area 13b, and also displays a page image with a page number of 5, which is the next page number after the page number 4, the page image being in portrait orientation, in the first display area 13a.

When the user rotates the terminal apparatus 10 clockwise through 90 degrees while executing step S240 illustrated at the third from the top in FIG. 11, the deciding section 12a recognizes that the orientation of the display section 13 has been changed from horizontal orientation to vertical orientation. Therefore, the deciding section 12a makes an affirmative decision in step S120 and returns to step S100. Then, in step S100 at the timing illustrated at the fourth from the top in FIG. 11, page number i is set to 5. In step S110 immediately after step S100, decisions are made in steps S200, S210, and S230 in that order and then step S250 is executed. Specifically, in the example at the fourth from the top in FIG. 11, in step S250, the display control section 12b displays the page image with the page number 5, the page image being in portrait orientation, across the first display area 13a and second display area 13b in such a way that the page image has a larger size than in step S240.

When the user rotates the terminal apparatus 10 clockwise through 90 degrees while executing step S250 illustrated at the fourth from the top in FIG. 11, the deciding section 12a recognizes that the orientation of the display section 13 has been changed from vertical orientation to horizontal orientation. Therefore, the deciding section 12a makes an affirmative decision in step S120 and returns to step S100. Therefore, in step S100 at the timing illustrated at the bottom in FIG. 11, page number i is set to 5. Then, in step S110 immediately after step S100, decisions are made in steps S200, S210, and S220 in that order and then step S240 is executed. Specifically, in the example at the bottom in FIG. 11, in step S240, the display control section 12b displays the page image with the page number 5, the page image being in portrait orientation, in the first display area 13a, and also displays a page image with a page number of 6, which is the next page number after the page number 5, the page image being in portrait orientation, in the second display area 13b.

Figure 12:
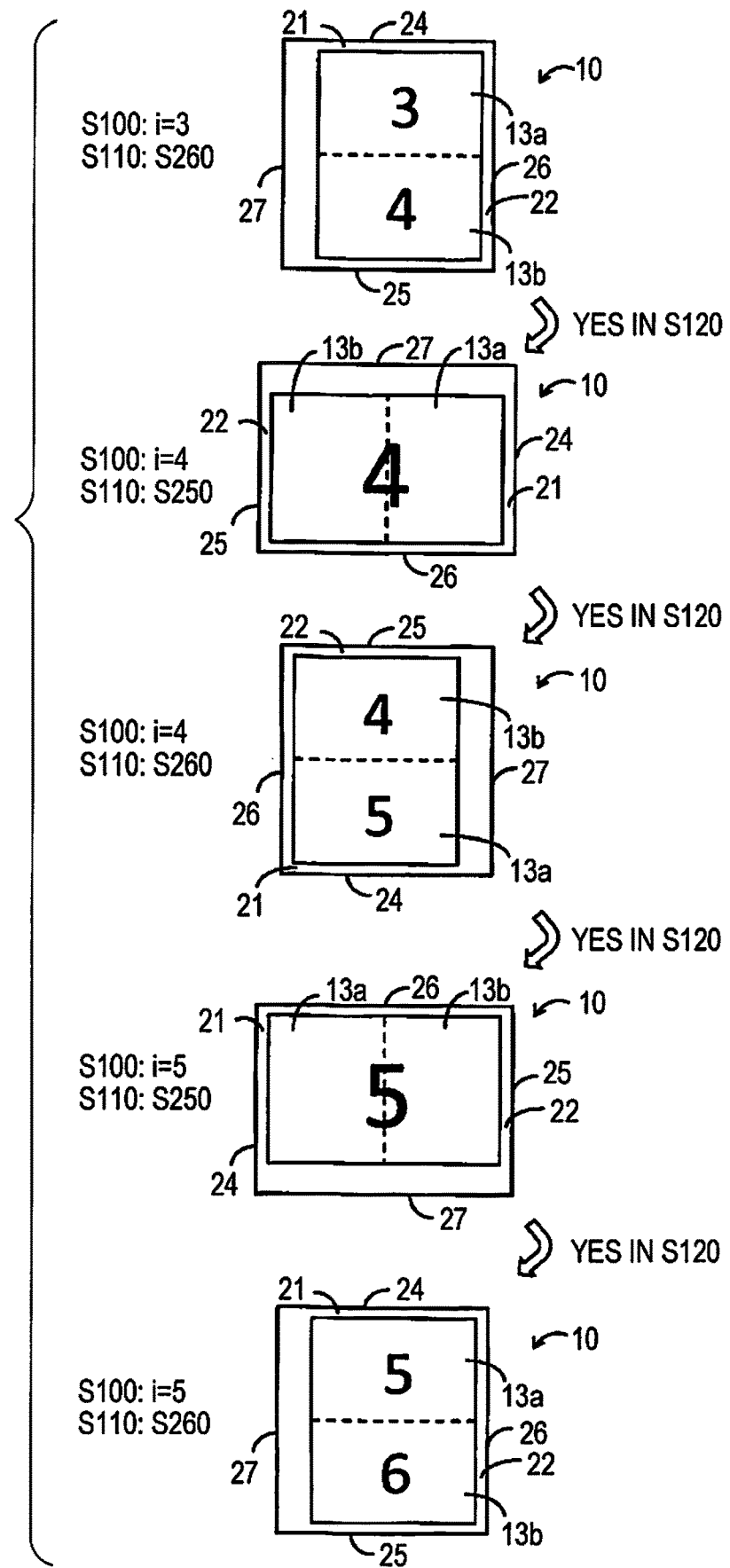
FIG. 12 illustrates how the third case and fourth case are repeated when the terminal apparatus in the unfolded state is rotated clockwise in the same plane.

FIG. 12 illustrates how the third case and fourth case are repeated when the terminal apparatus 10 in the unfolded state is rotated in the same plane. In FIG. 12, the terminal apparatus 10 is rotated clockwise through 90 degrees four times, resulting in a rotation of 360 degrees.

It will be assumed that page number i is set to 3 in step S100 at a certain timing, as illustrated at the top in FIG. 12. In step S110 immediately after step S100, decisions are made in steps S200, S210, and S230 in that order and then step S260 is executed. Specifically, in the example at the top in FIG. 12, in step S260, the display control section 12b displays the page image with the page number 3, the page image being in landscape orientation, in the first display area 13a, and also displays the page image with the page number 4, which is the next page number after the page number 3, the page image being in landscape orientation, in the second display area 13b.

When the user rotates the terminal apparatus 10 clockwise through 90 degrees while executing step S260 illustrated at the top in FIG. 12, the deciding section 12a recognizes that the orientation of the display section 13 has been changed from vertical orientation to horizontal orientation. Therefore, the deciding section 12a makes an affirmative decision in step S120 and returns to step S100. When the display section 13 is rotated clockwise and its orientation is thereby changed to horizontal orientation while step S260 is in progress, the display control section 12b adds 1 to page number i that has been set so far and sets the resulting page number as new page number i in step S100. Therefore, in step S100 at the timing illustrated at the second from the top in FIG. 12, page number i is set to 4. In step S110 immediately after step S100, decisions are made in steps S200, S210, and S220 in that order and then step S250 is executed. Specifically, in the example at the second from the top in FIG. 12, in step S250, the display control section 12b displays the page image with the page number 4, the page image being in landscape orientation, across the first display area 13a and second display area 13b in such a way that the page image has a larger size than in step S260.

When the user rotates the terminal apparatus 10 clockwise through 90 degrees while executing step S250 illustrated at the second from the top in FIG. 12, the deciding section 12a recognizes that the orientation of the display section 13 has been changed from horizontal orientation to vertical orientation. Therefore, the deciding section 12a makes an affirmative decision in step S120 and returns to step S100. When the display section 13 is rotated clockwise and its orientation is thereby changed to vertical orientation while step S250 is in progress in the fourth case, the display control section 12b sets, in step S100, the same page number i as page number i that has been set so far. Therefore, in step S100 at the timing illustrated at the third from the top in FIG. 12, page number i is set to 4. In step S110 immediately after step S100, decisions are made in steps S200, S210, and S230 in that order and then step S260 is executed. Specifically, in the example at the third from the top in FIG. 12, in step S260, the display control section 12b displays the page image with the page number 4, the page image being in landscape orientation, in the second display area 13b, and also displays the page image with the page number 5, which is the next page number after the page number 4, the page image being in landscape orientation, in the first display area 13a.

When the user rotates the terminal apparatus 10 clockwise through 90 degrees while executing step S260 illustrated at the third from the top in FIG. 12, the deciding section 12a recognizes that the orientation of the display section 13 has been changed from vertical orientation to horizontal orientation. Therefore, the deciding section 12a makes an affirmative decision in step S120 and returns to step S100. Then, in step S100 at the timing illustrated at the fourth from the top in FIG. 12, page number i is set to 5. In step S110 immediately after step S100, decisions are made in steps S200, S210, and S220 in that order and then step S250 is executed. Specifically, in the example at the fourth from the top in FIG. 12, in step S250, the display control section 12b displays the page image with the page number 5, the page image being in landscape orientation, across the first display area 13a and second display area 13b in such a way that the page image has a larger size than in step S260.

When the user rotates the terminal apparatus 10 clockwise through 90 degrees while executing step S250 illustrated at the fourth from the top in FIG. 12, the deciding section 12a recognizes that the orientation of the display section 13 has been changed from horizontal orientation to vertical orientation. Therefore, the deciding section 12a makes an affirmative decision in step S120 and returns to step S100. Therefore, in step S100 at the timing illustrated at the bottom in FIG. 12, page number i is set to 5. Then, in step S110 immediately after step S100, decisions are made in steps S200, S210, and S230 in that order and then step S260 is executed. Specifically, in the example at the bottom in FIG. 12, in step S260, the display control section 12b displays the page image with the page number 5, the page image being in landscape orientation, in the first display area 13a, and also displays the page image with the page number 6, which is the next page number after the page number 5, the page image being in landscape orientation, in the second display area 13b.

As described above with reference to FIGS. 11 and 12, when the display section 13 is rotated clockwise through 360 degrees in the same plane in a state in which the first page image and second page image are displayed on the display section 13 in the first case or third case, the display control section 12b displays, on the display section 13, a third page image and a fourth page image that represent a combination of a third page and a fourth page, the combination being contiguous to a combination of the first page and second page. As described above, when the terminal apparatus 10 is structured so that when the terminal apparatus 10 is rotated clockwise in the same plane, the terminal apparatus 10 advances to the next page, the combination of the third page and fourth page is contiguous to the combination of the first page and second page and has larger page numbers than the combination of the first page and second page. In the examples in FIGS. 11 and 12, when the user rotates the display section 13 through 360 degrees in the same plane in a state in which the page image with the page number 3 and the page image with the page number 4 are displayed on the display section 13, the user can display the page image with the page number 5 and the page image with the page number 6 on the display section 13.

Figure 13:
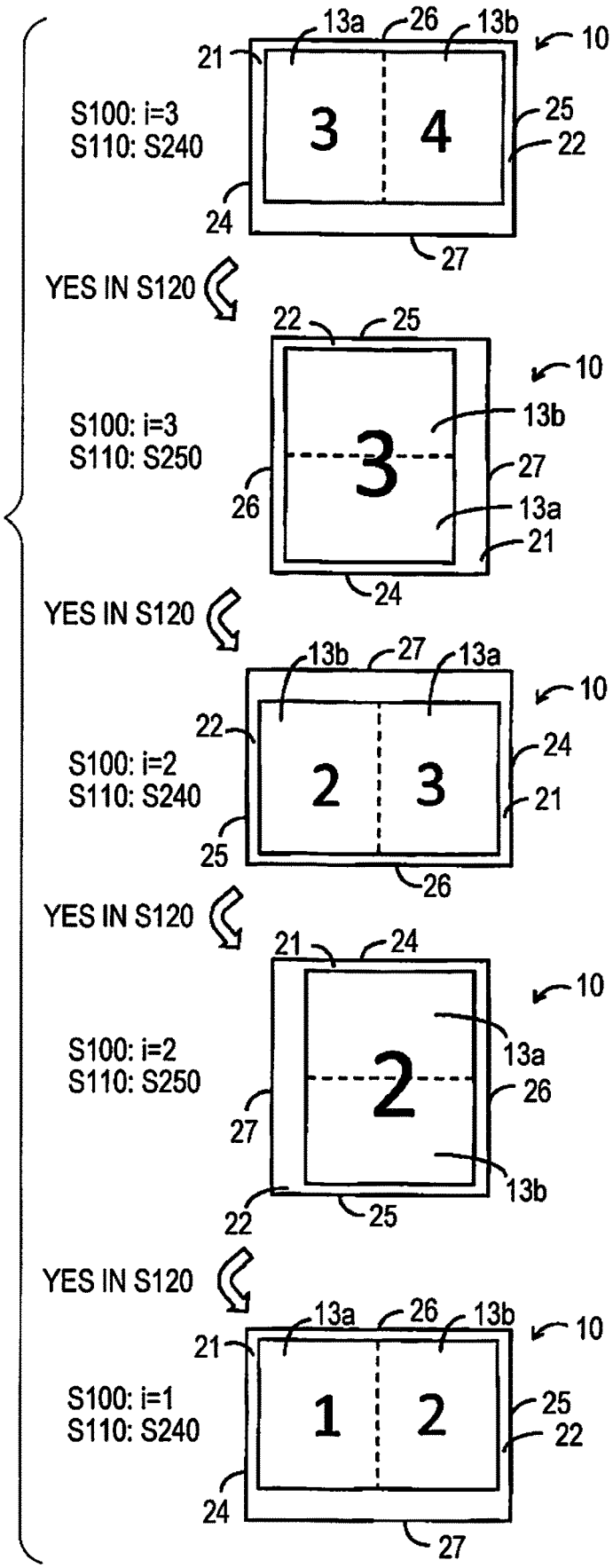
FIG. 13 illustrates how the first case and second case are repeated when the terminal apparatus in the unfolded state is rotated counterclockwise in the same plane.

FIG. 13 illustrates how the first case and second case are repeated when the terminal apparatus 10 in the unfolded state is rotated in the same plane. In FIG. 13, the terminal apparatus 10 is rotated counterclockwise through 90 degrees four times, resulting in a rotation of 360 degrees.

It will be assumed that page number i is set to 3 in step S100 at a certain timing, as illustrated at the top in FIG. 13. In step S110 immediately after step S100, decisions are made in steps S200, S210, and S220 in that order and then step S240 is executed. That is, the example at the top in FIG. 13 is the same as the example at the top in FIG. 11.

When the user rotates the terminal apparatus 10 counterclockwise through 90 degrees while executing step S240 illustrated at the top in FIG. 13, the deciding section 12a recognizes that the orientation of the display section 13 has been changed from horizontal orientation to vertical orientation. Therefore, the deciding section 12a makes an affirmative decision in step S120 and returns to step S100. When the display section 13 is rotated counterclockwise and its orientation is thereby changed to vertical orientation while step S240 is in progress, the display control section 12b sets, in step S100, the same page number i as page number i that has been set so far. Therefore, in step S100 at the timing illustrated at the second from the top in FIG. 13, page number i is set to 3. In step S110 immediately after step S100, decisions are made in steps S200, S210, and S230 in that order and then step S250 is executed. Specifically, in the example at the second from the top in FIG. 13, in step S250, the display control section 12b displays the page image with the page number 3, the page image being in portrait orientation, across the first display area 13a and second display area 13b in such a way that the page image has a larger size than in step S240.

When the user rotates the terminal apparatus 10 counterclockwise through 90 degrees while executing step S250 illustrated at the second from the top in FIG. 13, the deciding section 12a recognizes that the orientation of the display section 13 has been changed from vertical orientation to horizontal orientation. Therefore, the deciding section 12a makes an affirmative decision in step S120 and returns to step S100. When the display section 13 is rotated counterclockwise and its orientation is thereby changed to horizontal orientation while step S250 is in progress in the second case, the display control section 12b subtracts 1 from page number i that has been set so far and sets the resulting page number as new page number i in step S100. Therefore, in step S100 at the timing illustrated at the third from the top in FIG. 13, page number i is set to 2. In step S110 immediately after step S100, decisions are made in steps S200, S210, and S220 in that order and then step S240 is executed. Specifically, in the example at the third from the top in FIG. 13, in step S240, the display control section 12b displays a page image with a page number of 2, the page image being in portrait orientation, in the second display area 13b, and also displays the page image with the page number 3, which is the next page number after the page number 2, the page image being in portrait orientation, in the first display area 13a.

When the user rotates the terminal apparatus 10 counterclockwise through 90 degrees while executing step S240 illustrated at the third from the top in FIG. 13, the deciding section 12a recognizes that the orientation of the display section 13 has been changed from horizontal orientation to vertical orientation. Therefore, the deciding section 12a makes an affirmative decision in step S120 and returns to step S100. Then, in step S100 at the timing illustrated at the fourth from the top in FIG. 13, page number i is set to 2. In step S110 immediately after step S100, decisions are made in steps S200, S210, and S230 in that order and then step S250 is executed. Specifically, in the example at the fourth from the top in FIG. 13, in step S250, the display control section 12b displays the page image with the page number 2, the page image being in portrait orientation, across the first display area 13a and second display area 13b in such a way that the page image has a larger size than in step S240.

When the user rotates the terminal apparatus 10 counterclockwise through 90 degrees while executing step S250 illustrated at the fourth from the top in FIG. 13, the deciding section 12a recognizes that the orientation of the display section 13 has been changed from vertical orientation to horizontal orientation. Therefore, the deciding section 12a makes an affirmative decision in step S120 and returns to step S100. Therefore, in step S100 at the timing illustrated at the bottom in FIG. 13, page number i is set to 1. Then, in step S110 immediately after step S100, decisions are made in steps S200, S210, and S220 in that order and then step S240 is executed. Specifically, in the example at the bottom in FIG. 13, in step S240, the display control section 12b displays a page image with a page number of 1, the page image being in portrait orientation, in the first display area 13a, and also displays the page image with the page number 2, which is the next page number after the page number 1, the page image being in portrait orientation, in the second display area 13b.

Figure 14:
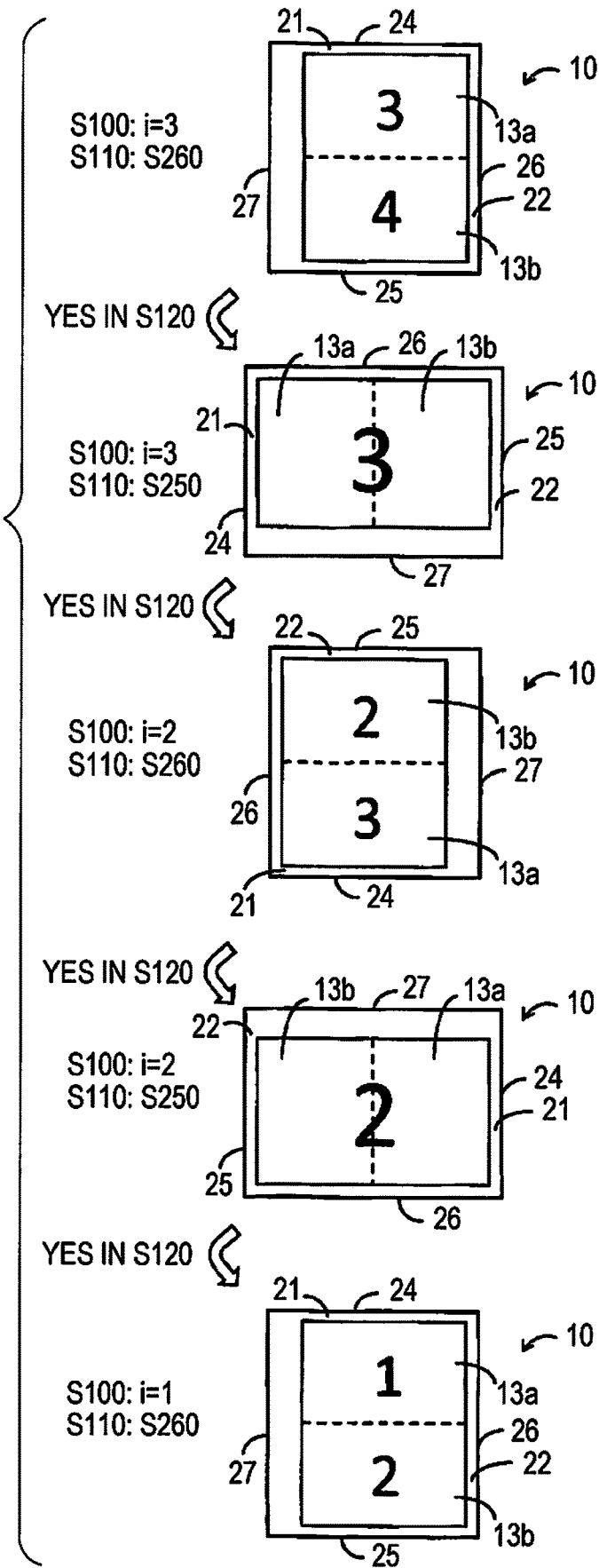
FIG. 14 illustrates how the third case and fourth case are repeated when the terminal apparatus in the unfolded state is rotated counterclockwise in the same plane.

FIG. 14 illustrates how the third case and fourth case are repeated when the terminal apparatus 10 in the unfolded state is rotated in the same plane. In FIG. 14, the terminal apparatus 10 is rotated counterclockwise through 90 degrees four times, resulting in a rotation of 360 degrees.

It will be assumed that page number i is set to 3 in step S100 at a certain timing, as illustrated at the top in FIG. 14. In step S110 immediately after step S100, decisions are made in steps S200, S210, and S230 in that order and then step S260 is executed. That is, the example at the top in FIG. 14 is the same as the example at the top in FIG. 12.

When the user rotates the terminal apparatus 10 counterclockwise through 90 degrees while executing step S260 illustrated at the top in FIG. 14, the deciding section 12a recognizes that the orientation of the display section 13 has been changed from vertical orientation to horizontal orientation. Therefore, the deciding section 12a makes an affirmative decision in step S120 and returns to step S100. When the display section 13 is rotated counterclockwise and its orientation is thereby changed to horizontal orientation while step S260 is in progress, the display control section 12b sets the same page number i as page number i that has been set so far. Therefore, in step S100 at the timing illustrated at the second from the top in FIG. 14, page number i is set to 3. In step S110 immediately after step S100, decisions are made in steps S200, S210, and S220 in that order and then step S250 is executed. Specifically, in the example at the second from the top in FIG. 14, in step S250, the display control section 12b displays the page image with the page number 3, the page image being in landscape orientation, across the first display area 13a and second display area 13b in such a way that the page image has a larger size than in step S260.

When the user rotates the terminal apparatus 10 counterclockwise through 90 degrees while executing step S250 illustrated at the second from the top in FIG. 14, the deciding section 12a recognizes that the orientation of the display section 13 has been changed from horizontal orientation to vertical orientation. Therefore, the deciding section 12a makes an affirmative decision in step S120 and returns to step S100. When the display section 13 is rotated counterclockwise and its orientation is thereby changed to vertical orientation while step S250 is in progress in the fourth case, the display control section 12b subtracts 1 from page number i that has been set so far and sets the resulting page number as new page number i in step S100. Therefore, in step S100 at the timing illustrated at the third from the top in FIG. 14, page number i is set to 2. In step S110 immediately after step S100, decisions are made in steps S200, S210, and S230 in that order and then step S260 is executed. Specifically, in the example at the third from the top in FIG. 14, in step S260, the display control section 12b displays the page image with the page number 2, the page image being in landscape orientation, in the second display area 13b, and also displays the page image with the page number 3, which is the next page number after the page number 2, the page image being in landscape orientation, in the first display area 13a.

When the user rotates the terminal apparatus 10 counterclockwise through 90 degrees while executing step S260 illustrated at the third from the top in FIG. 14, the deciding section 12a recognizes that the orientation of the display section 13 has been changed from vertical orientation to horizontal orientation. Therefore, the deciding section 12a makes an affirmative decision in step S120 and returns to step S100. Then, in step S100 at the timing illustrated at the fourth from the top in FIG. 14, page number i is set to 2. In step S110 immediately after step S100, decisions are made in steps S200, S210, and S220 in that order and then step S250 is executed. Specifically, in the example at the fourth from the top in FIG. 14, in step S250, the display control section 12b displays the page image with the page number 2, the page image being in landscape orientation, across the first display area 13a and second display area 13b in such a way that the page image has a larger size than in step S260.

When the user rotates the terminal apparatus 10 counterclockwise through 90 degrees while executing step S250 illustrated at the fourth from the top in FIG. 14, the deciding section 12a recognizes that the orientation of the display section 13 has been changed from horizontal orientation to vertical orientation. Therefore, the deciding section 12a makes an affirmative decision in step S120 and returns to step S100. Therefore, in step S100 at the timing illustrated at the bottom in FIG. 14, page number i is set to 1. Then, in step S110 immediately after step S100, decisions are made in steps S200, S210, and S230 in that order and then step S260 is executed. Specifically, in the example at the bottom in FIG. 14, in step S260, the display control section 12b displays the page image with the page number 1, the page image being in landscape orientation, in the first display area 13a, and also displays the page image with the page number 2, which is the next page number after the page number 1, the page image being in landscape orientation, in the second display area 13b.

As described above with reference to FIGS. 13 and 14, when the display section 13 is rotated counterclockwise through 360 degrees in the same plane in a state in which the first page image and second page image are displayed on the display section 13 in the first case or third case, the display control section 12b displays, on the display section 13, a fifth page image and a sixth page image that represent a combination of a fifth page and a sixth page, which are different from the third page and fourth page, the combination being contiguous to the combination of the first page and second page. As described above, when the terminal apparatus 10 is structured so that when the terminal apparatus 10 is rotated counterclockwise in the same plane, the terminal apparatus 10 goes back to the previous page, the combination of the fifth page and sixth page is contiguous to the combination of the first page and second page and has smaller page numbers than the combination of the first page and second page. In the examples in FIGS. 13 and 14, when the user rotates the display section 13 through 360 degrees in the same plane in a state in which the page image with the page number 3 and the page image with the page number 4 are displayed on the display section 13, the user can display the page image with the page number 1 and the page image with the page number 2 on the display section 13.

6. Conclusion

In this embodiment described above, a display apparatus has a display section 13 on which an image is displayed, a deciding section 12a that makes a decision about the orientation of the display section 13, and a display control section 12b that controls displaying on the display section 13. In displaying a first page image representing a first page, a second page image representing a second page, or both on the display section 13, in a first case in which images to be displayed are in portrait orientation and the display section 13 is in horizontal orientation, the display control section 12b displays the first page image and second page image on the display section 13 so that the page images are arranged horizontally; in a second case in which an image to be displayed is in portrait orientation and the display section 13 is in vertical orientation, the display control section 12b displays the first page image or second page image on the display section 13 so that the page image has a larger size than in the first case; in a third case in which images to be displayed are in landscape orientation and the display section 13 is in vertical orientation, the display control section 12b displays the first page image and second page image on the display section 13 so that the page images are arranged vertically; and in a fourth case in which an image to be displayed is in landscape orientation and the display section 13 is in horizontal orientation, the display control section 12b displays the first page image or second page image on the display section 13 so that the page image has a larger size than in the third case.

With the above arrangement, the display apparatus switches a mode in which a page image or page images are displayed on the display section 13, depending on whether page image orientation is portrait or landscape. Thus, an environment in which a page image or page images are easier to view is provided for the user. Specifically, when page image orientation is portrait and the display section 13 is in vertical orientation or when page image orientation is landscape and the display section 13 is in horizontal orientation, the page image orientation matches the orientation of the display section 13, so a page image for one page is displayed on the display section 13 in such a way that the page image has a large size. Accordingly, the user can view the page image in detail. When page image orientation is portrait and the display section 13 is in horizontal orientation, or when page image orientation is landscape and the display section 13 is in vertical orientation, page images for two pages are displayed on the display section 13 so that the page images are arranged. Accordingly the space of the display section 13 can be efficiently used.

In this embodiment, the display section 13 can be changed to a plurality of states including a folded state in which the display section 13 is folded along a boundary between a first display area 13a and a second display area 13b and the first display area 13a and second display area 13b face in opposite directions and an unfolded state in which the first display area 13a and second display area 13b face in the same direction without the display section 13 being folded along the boundary. A state of the display section 13 other than the folded state and unfolded state is, for example, a state at an intermediate point during a changeover of the state between the folded state and the unfolded state.

The deciding section 12a decides that when the first display area 13a and second display area 13b are arranged horizontally with the display section 13 being in the unfolded state, the display section 13 is in horizontal orientation, and that when the first display area 13a and second display area 13b are arranged vertically with the display section 13 being in the unfolded state, the display section 13 is in vertical orientation.

In the first case or third case, the display control section 12b displays the first page image in one of the first display area 13a and second display area 13b and also displays the second page image in the other of the first display area 13a and second display area 13b; in the second case or fourth case, the display control section 12b displays the first page image or second page image across the first display area 13a and second display area 13b.

When the display section 13 is in a state at an intermediate point during a changeover of the state between the folded state and the unfolded state, the deciding section 12a may regard the display section 13 as being in either the folded state or the unfolded state. Then, display control section 12b may control a display on the display section 13 according to the state regarded in this way. When the display section 13 is in a state at an intermediate point during rotation between horizontal orientation and vertical orientation, the deciding section 12a may regard the display section 13 as being in either horizontal orientation or vertical orientation. Then, the display control section 12b may control a display on the display section 13 according to the orientation regarded in this way.

With the above arrangement, when page image orientation is portrait and the display section 13 is in vertical orientation or when page image orientation is landscape and the display section 13 is in horizontal orientation, a large-size page image for one page is displayed across the first display area 13a and second display area 13b of the display section 13 in unfolded state, as illustrated in FIGS. 6B and 7B. When page image orientation is portrait and the display section 13 is in horizontal orientation or when page image orientation is landscape and the display section 13 is in vertical orientation, page images for two pages are displayed separately in the first display area 13a and second display area 13b of the display section 13 in the unfolded state, as illustrated in FIGS. 6A and 7A.

In this embodiment, when the display section 13 is in the folded state with the boundary being in vertical orientation, the display control section 12b displays one of the first page image and second page image in one of the first display area 13a and second display area 13b of the display section 13, and also displays the other of the first page image and second page image in the other of the first display area 13a and second display area 13b at a position at which the other page image coincides with the one page image. When the display section 13 is in the folded state with the boundary being in horizontal orientation, the display control section 12b displays one of the first page image and second page image in one of the first display area 13a and second display area 13b, rotates the other of the first page image and second page image through 180 degrees in the other of the first display area 13a and second display area 13b, and displays the other page image at a position at which the other page image coincides with the one page image.

With the above arrangement, when the display section 13 is in the folded state, a page image can be displayed in each of the first display area 13a and second display area 13b in a manner in which the user can easily view these page images, regardless of whether the boundary in horizontal orientation or vertical orientation.

In this embodiment, when the first page image and second page image have different sizes in the first case or third case, the display control section 12b displays the first page image or second page image, whichever is smaller in size, in part of one of the first display area 13a and second display area 13b, and also displays the first page image or second page image, whichever is larger in size, across the remaining area of the one of the first display area 13a and second display area 13b and the other of the first display area 13a and second display area 13b.

With the above arrangement, when the first page image and second page image have different sizes, a larger area is assigned to an image having a larger size on the display section 13 so that the first page image and second page image are each displayed in appropriate size.

Here, it will be assumed that a page image with page number i is in A4 size and is in portrait orientation and that a page image with page number i+1 is in A3 size and is in landscape orientation. Then, as in the example in FIG. 10A, the display control section 12b may make a match between the height of the portrait page image with page number i and the height of the landscape page image with page number i+1, and may display these page images for two pages in the display section 13 so that the page images are arranged horizontally. Also, it will be assumed that the page image with page number i is in A4 size and is in landscape orientation and that the page image with page number i+1 is in A3 size and is in portrait orientation. Then, as in the example in FIG. 10B, the display control section 12b may make a match between the width of the landscape page image with page number i and the width of the portrait page image with page number i+1, and may display these page images for two pages in the display section 13 so that the page images are arranged vertically.

In this embodiment, when the display section 13 is rotated clockwise through 360 degrees in the same plane in a state in which the first page image and second page image are displayed on the display section 13 in the first case or third case, the display control section 12b displays, on the display section 13, a third page image and a fourth page image that represent a combination of a third page and a fourth page, the combination being contiguous to a combination of the first page and second page.

In this embodiment, when the display section 13 is rotated counterclockwise through 360 degrees in the same plane in a state in which the first page image and second page image are displayed on the display section 13 in the first case or third case, the display control section 12b displays, on the display section 13, a fifth page image and a sixth page image that represent a combination of a fifth page and a sixth page, the combination being contiguous to the combination of the first page and second page and being different from the combination of the third page and fourth page.

With the above arrangement, the user can easily change page images to be displayed on the display section 13 by rotating the display section 13 clockwise or counterclockwise in the same plane.

In this embodiment, when the first page image and second page image are oriented in different longitudinal directions, the display control section 12b decides which of the first to fourth cases holds depending on whether the first page image is in portrait orientation or in landscape orientation and whether the display section 13 is in horizontal orientation or in vertical orientation.

With the above arrangement, even when the first page image and second page image are oriented in different longitudinal directions, the display control section 12b can decide which of the first to fourth cases holds and enables a display suitable mainly for the first page image to be produced.

This embodiment also discloses a non-transitory computer-readable storage medium storing a display control program 12 that controls the displaying of an image or images on the display section 13. In displaying a first page image representing a first page, a second page image representing a second page, or both on the display section 13, in a first case in which images to be displayed are in portrait orientation and the display section 13 is in horizontal orientation, the display control program 12 displays the first page image and second page image on the display section 13 so that the page images are arranged horizontally; in a second case in which an image to be displayed is in portrait orientation and the display section 13 is in vertical orientation, the display control program 12 displays the first page image or second page image on the display section 13 so that the page image has a larger size than in the first case; in a third case in which images to be displayed are in landscape orientation and the display section 13 is in vertical orientation, the display control program 12 displays the first page image and second page image on the display section 13 so that the page images are arranged vertically; and in a fourth case in which an image to be displayed is in landscape orientation and the display section 13 is in horizontal orientation, the display control program 12 displays the first page image or second page image on the display section 13 so that the page image has a larger size than in the third case.

Display control processing in this embodiment is of course applicable to other than a preview display of an image file to be printed. For example, this embodiment may be applied so that the terminal apparatus 10 acquires an image file created as a result of a scanner (not illustrated) reading an original of a plurality of pages and display the image file on the display section 13 so that the user views the image file.

The display section 13 may be a non-foldable touch pane shaped like a single sheet. When the display section 13 is of this type, the deciding section 12a decides that when the longitudinal direction of the panel is horizontal, the display section 13 is in horizontal orientation and that when the longitudinal direction of the panel is vertical, the display section 13 is in vertical orientation. When the display section 13 is a non-foldable touch pane shaped like a single sheet, the display control section 12b regards one of two areas resulting from substantially bisecting the panel in the longitudinal direction as the first display area 13a, and also regards the other of the two areas as the second display area 13b.

When the display control section 12b executes display control processing to display a preview of an image to be printed, the display control section 12b may determine whether to execute or skip step S280 in FIG. 5 according to a double-sided printing setting, which is a so-called long-edge binding or short-edge binding. A double-sided printing setting is assumed to have been set by the user in advance.

For example, with the boundary being in horizontal orientation (Yes in step S270), when the page image is in landscape orientation and short-edge binding is set, the display control section 12b executes step S280 and proceeds to step S290. With the boundary being in horizontal orientation (Yes in step S270), when the page image is in landscape orientation and long-edge binding is set, the display control section 12b skips step S280 and proceeds to step S290.

For example, with the boundary being in vertical orientation (No in step S270), when the page image is in portrait orientation and short-edge binding is set, the display control section 12b executes step S280 and proceeds to step S290. With the boundary being in vertical orientation (No in step S270), when the page image is in portrait orientation and long-edge binding is set, the display control section 12b skips step S280 and proceeds to step S290.

As described above, when the display control section 12b determines whether to execute or skip step S280 according to a double-sided printing setting, the display control section 12b can give the user a preview of a printing result displayed on the display section 13 in the folded state according to the double-sided printing setting.

With the main page or pages displayed as described above, to have the user recognize what type other pages are, the other pages may be displayed as reference pages. For example, page i−1 and page i+2 may be displayed as reference pages in FIG. 6A, and page i−1 and page i+1 may be displayed as reference pages in FIG. 6B. To prevent these reference pages from interfering with the view of the main page or pages, however, the reference pages should be displayed in smaller sizes than the sizes of the main page or pages by cutting only part from the reference pages or reducing them.

What is claimed is:

1. A display apparatus, comprising:
a display changeable to a plurality of states including a folded state in which the display is folded along a boundary between a first display area and a second display area and the first display area and the second display area face in opposite directions and an unfolded state in which the first display area and the second display area face in a same direction without the display being folded along the boundary;
a processor that determines an orientation and a state of the display and controls displaying of a page image on the display according to the orientation and the state of the display,
in a state of displaying an image file including a first page image representing a first page and a second page image representing a second page that is a next page of the first page, the processor switching between a first display state in which the first page image is displayed across the first display area and the second display area while the display being in the unfolded state and a second display state in which the first page image is displayed on the first display area and the second page image is displayed on the second display area while the display being in the folded state in response to a user changing the state of the display between the folded state and the unfolded state,
the processor selectively executing, according to whether the first page image is in portrait orientation or in landscape orientation, one of a first mode in which the first display state and the second display state are switched in response to the user changing the state of the display between the folded state and the unfolded state and a second mode in which the second display state and a third display state in which the first page image and the second page image are displayed on the first display area and the second display area while the display being in the unfolded state are switched in response to the user changing the state of the display between the folded state and the unfolded state,
the processor displaying the first page image on the display in the first display state so that the first page image has a larger size than in the third display state,
the processor determining an orientation of the boundary,
in response to detecting a change of the state of the display from the unfolded state to the folded state and determining that the boundary is in vertical orientation while the display is in the first display state, the processor switching from the first display state to the second display state while maintaining an orientation of the first page image, and
in response to detecting the change of the state of the display from the unfolded state to the folded state and determining that the boundary is in horizontal orientation while the display is in the first display state, the processor switching from the first display state to the second display state with rotating one of the first page image and the second page image through 180 degrees in respective one of the first display area and the second display area, and displaying the one of the first page image and the second page image at a position at which the one of the first page image and the second page image coincides with the other one of the first page image and the second page image.

2. The display apparatus according to claim 1, wherein in displaying the first page image, the second page image, or both on the display in the unfolded state,
in a first case in which images to be displayed are in portrait orientation and the display is in horizontal orientation, the processor displays the first page image and the second page image on the display so that the first page image and the second page image are arranged horizontally,
in a second case in which an image to be displayed is in portrait orientation and the display is in vertical orientation, the processor displays the first page image or the second page image on the display so that the first page image or the second page image has a larger size than in the first case,
in a third case in which images to be displayed are in landscape orientation and the display is in vertical orientation, the processor displays the first page image and the second page image on the display so that the first page image and the second page image are arranged vertically, and
in a fourth case in which an image to be displayed is in landscape orientation and the display is in horizontal orientation, the processor displays the first page image or the second page image on the display so that the first page image or the second page image has a larger size than in the third case.

3. The display apparatus according to claim 2, wherein the processor does not display the second page image when the display is in the first display state.

4. The display apparatus according to claim 2, wherein when the display is rotated clockwise through 360 degrees in a same plane in a state in which the first page image and the second page image are displayed on the display in the first case or the third case, the processor displays, on the display, a third page image and a fourth page image that represent a combination of a third page and a fourth page, the combination of the third page and the fourth page being contiguous to a combination of the first page and the second page.

5. The display apparatus according to claim 1, wherein when the display is rotated counterclockwise through 360 degrees in the same plane in the state in which the first page image and the second page image are displayed on the display in the first case or the third case, the processor displays, on the display, a fifth page image and a sixth page image that represent a combination of a fifth page and a sixth page, the combination of the fifth page and the sixth page being contiguous to the combination of the first page and the second page and being different from the combination of the third page and the fourth page.

6. The display apparatus according to claim 2, wherein when the first page image is oriented in a longitudinal direction that is different from that of the second page image, the processor decides which of the first to the fourth cases holds depending on whether the first page image is in portrait orientation or in landscape orientation and whether the display is in horizontal orientation or in vertical orientation.

7. A non-transitory computer-readable storage medium storing a display control program that controls displaying of a page image on a display changeable to a plurality of states including a folded state in which the display is folded along a boundary between a first display area and a second display area and the first display area and the second display area face in opposite directions and an unfolded state in which the first display area and the second display area face in a same direction without the display being folded along the boundary, wherein the display control program
 determines an orientation and a state of the display,
 controls the displaying of the page image on the display according to the orientation and the state of the display,
 in a state of displaying an image file including a first page image representing a first page and a second page image representing a second page that is a next page of the first page, switches between a first display state in which the first page image is displayed across the first display area and the second display area while the display being in the unfolded state and a second display state in which the first page image is displayed on the first display area and the second page image is displayed on the second display area while the display being in the folded state in response to a user changing the state of the display between the folded state and the unfolded state,
 selectively executes, according to whether the first page image is in portrait orientation or in landscape orientation, one of a first mode in which the first display state and the second display state are switched in response to the user changing the state of the display between the folded state and the unfolded state and a second mode in which the second display state and a third display state in which the first page image and the second page image are displayed on the first display area and the second display area while the display being in the unfolded state are switched in response to the user changing the state of the display between the folded state and the unfolded state,
 displays the first page image on the display in the first display state so that the first page image has a larger size than in the third display state,
 determines an orientation of the boundary,
 in response to detecting a change of the state of the display from the unfolded state to the folded state and determining that the boundary is in vertical orientation while the display is in the first display state, switches from the first display state to the second display state while maintaining an orientation of the first page image, and
 in response to detecting the change of the state of the display from the unfolded state to the folded state and determining that the boundary is in horizontal orientation while the display is in the first display state, switches from the first display state to the second display state with rotating one of the first page image and the second page image through 180 degrees in respective one of the first display area and the second display area, and displays the one of the first page image and the second page image at a position at which the one of the first page image and the second page image coincides with the other one of the first page image and the second page image.

8. A non-transitory computer-readable storage medium storing a display control program that controls displaying of a page image on a display, wherein the display control program
 determines orientation of the display,
 displays a first page image representing a first page and a second page image representing a second page,
 determines whether the page image is in portrait orientation or in landscape orientation, and
 wherein in response to determining that the first page image is orientated in a longitudinal direction that is different from that of the second page image based on a determination result about whether the page image is in portrait orientation or in landscape orientation, the display control program automatically changes a display mode on the display depending on both whether the first page image is in portrait orientation or in landscape orientation and whether the display is in horizontal orientation or in vertical orientation.

9. A display apparatus, comprising:
 a display on which an image is displayed; and
 a processor that determines orientation of the display and controls displaying of a page image on the display,
 the processor determining whether the page image is in portrait orientation or in landscape orientation,
 the processor selecting a display mode of the page image on the display according to both a determination result about whether the page image is in portrait orientation or in landscape orientation and a determination result about the orientation of the display such that the page image is displayed on the display in a different manner according to both the determination result about whether the page image is in portrait orientation or in landscape orientation and the determination result about the orientation of the display, in displaying a first page image representing a first page, a second page image representing a second page, or both on the display,
- in a first case in which images to be displayed are in portrait orientation and the display is in horizontal orientation, the processor displaying the first page image and the second page image on the display so that the first page image and the second page image are arranged horizontally,
- in a second case in which an image to be displayed is in portrait orientation and the display is in vertical orientation, the processor displaying the first page image or the second page image on the display so that the first page image or the second page image has a larger size than in the first case,
- in a third case in which images to be displayed are in landscape orientation and the display is in vertical orientation, the processor displaying the first page image and the second page image on the display so that the first page image and the second page image are arranged vertically, and
- in a fourth case in which an image to be displayed is in landscape orientation and the display is in horizontal orientation, the processor displaying the first page image or the second page image on the display so that the first page image or the second page image has a larger size than in the third case, and when the display is rotated clockwise through 360 degrees in a same plane in a state in which the first page image and the second page image are displayed on the display in the first case or the third case, the processor displaying, on the display, a third page image and a fourth page image that represent a combination of a third page and a fourth page, the combination of the third page and the fourth page being contiguous to a combination of the first page and the second page.

10. The display apparatus according to claim 9, wherein when the display is rotated counterclockwise through 360 degrees in the same plane in the state in which the first page image and the second page image are displayed on the display in the first case or the third case, the processor displays, on the display, a fifth page image and a sixth page image that represent a combination of a fifth page and a sixth page, the combination of the fifth page and the sixth page being contiguous to the combination of the first page and the second page and being different from the combination of the third page and the fourth page.

11. A display apparatus, comprising:
a display; and
a processor that
  determines orientation of the display,
  displays a page image including a first page image representing a first page and a second page image representing a second page, and
  determines whether the page image is in portrait orientation or in landscape orientation,
in response to determining that the first page image is oriented in a longitudinal direction that is different from that of the second page image based on a determination result about whether the page image is in portrait orientation or in landscape orientation, the processor automatically changing a display mode on the display depending on both whether the first page image is in portrait orientation or in landscape orientation and whether the display is in horizontal orientation or in vertical orientation.

12. A non-transitory computer-readable storage medium storing a display control program that controls displaying of a page image on a display, wherein the display control program
  determines orientation of the display,
  determines whether the page image is in portrait orientation or in landscape orientation, and
  selects a display mode of the page image on the display according to both a determination result about whether the page image is in portrait orientation or in landscape orientation and a determination result about the orientation of the display such that the page image is displayed on the display in a different manner according to both the determination result about whether the page image is in portrait orientation or in landscape orientation and the determination result about the orientation of the display,
wherein in displaying a first page image representing a first page, a second page image representing a second page, or both on the display,
  - in a first case in which images to be displayed are in portrait orientation and the display is in horizontal orientation, the display control program displays the first page image and the second page image on the display so that the first page image and the second page image are arranged horizontally,
  - in a second case in which an image to be displayed is in portrait orientation and the display is in vertical orientation, the display control program displays the first page image or the second page image on the display so that the first page image or the second page image has a larger size than in the first case,
  - in a third case in which images to be displayed are in landscape orientation and the display is in vertical orientation, the display control program displays the first page image and the second page image on the display so that the first page image and the second page image are arranged vertically, and
  - in a fourth case in which an image to be displayed is in landscape orientation and the display is in horizontal orientation, the display control program displays the first page image or the second page image on the display so that the first page image or the second page image has a larger size than in the third case, and
wherein when the display is rotated clockwise through 360 degrees in a same plane in a state in which the first page image and the second page image are displayed on the display in the first case or the third case, the display control program displays, on the display, a third page image and a fourth page image that represent a combination of a third page and a fourth page, the combination of the third page and the fourth page being contiguous to a combination of the first page and the second page.

* * * * *